US010434496B2

(12) United States Patent
Wei et al.

(10) Patent No.: US 10,434,496 B2
(45) Date of Patent: Oct. 8, 2019

(54) SUPERFICIALLY POROUS PARTICLES WITH DUAL PORE STRUCTURE AND METHODS FOR MAKING THE SAME

(71) Applicant: AGILENT TECHNOLOGIES, INC., Santa Clara, CA (US)

(72) Inventors: Ta-Chen Wei, Newark, DE (US); Xiaoli Wang, West Chester, PA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 226 days.

(21) Appl. No.: 15/084,194

(22) Filed: Mar. 29, 2016

(65) Prior Publication Data

US 2017/0282155 A1 Oct. 5, 2017

(51) Int. Cl.
*B01J 20/283* (2006.01)
*B01J 20/28* (2006.01)
*B01D 15/20* (2006.01)

(52) U.S. Cl.
CPC .......... *B01J 20/283* (2013.01); *B01D 15/206* (2013.01); *B01J 20/2808* (2013.01); *B01J 20/28083* (2013.01); *B01J 20/28085* (2013.01)

(58) Field of Classification Search
None
See application file for complete search history.

(56) References Cited

U.S. PATENT DOCUMENTS

| 3,485,658 | A | 12/1969 | Iler |
| 3,505,785 | A | 4/1970 | Kirkland |
| 3,634,588 | A | 1/1972 | Robert et al. |
| 4,017,528 | A | 4/1977 | Unger et al. |
| 4,477,492 | A | 10/1984 | Bergna et al. |
| 4,775,520 | A | 9/1988 | Unger et al. |

(Continued)

FOREIGN PATENT DOCUMENTS

| EP | 0182618 | 5/1986 |
| WO | WO 2006019988 | 2/2006 |

(Continued)

OTHER PUBLICATIONS

Du et al., "Developing Functionalized Dendrimer-Like Silica Nanoparticles with Hierarchical Pores as Advanced Delivery Nanocarriers" Adv Mater, Nov. 2013, pp. 5981-5985, vol. 25, No. 41.

(Continued)

*Primary Examiner* — Jeffrey D Washville

(57) ABSTRACT

Superficially porous particles are provided. Aspects of the superficially porous particles include a non-porous inner core and a porous outer shell that includes inner and outer porous regions. The inner porous region can include ordered cylindrical pores substantially perpendicular to the non-porous inner core. The outer porous region can include conical pores which extend to the surface of the particles and which are in fluid communication with the cylindrical pores of the inner porous region. Also provided are methods of making the subject superficially porous particles. Aspects of the methods include subjecting substantially solid inorganic oxide particles to agitation in an aqueous solution in the presence of a first cationic surfactant and a second anionic surfactant, which together form micelles, to pseudomorphically transform the particles.

20 Claims, 11 Drawing Sheets

Specification includes a Sequence Listing.

(56) References Cited

U.S. PATENT DOCUMENTS

| | | | |
|---|---|---|---|
| 4,983,369 | A | 1/1991 | Barder et al. |
| 5,057,296 | A | 10/1991 | Beck |
| 5,304,243 | A | 4/1994 | Yamaguchi et al. |
| 6,528,167 | B2 | 3/2003 | O'Gara |
| 6,686,035 | B2 | 2/2004 | Jiang et al. |
| 7,223,473 | B2 | 5/2007 | Jiang et al. |
| 7,563,367 | B2 | 7/2009 | Rustamov et al. |
| 7,846,337 | B2 | 12/2010 | Chen et al. |
| 7,976,812 | B2 | 7/2011 | Yamada et al. |
| 7,994,085 | B2 | 8/2011 | Chaumonnot et al. |
| 8,277,883 | B2 | 10/2012 | Chen et al. |
| 8,357,628 | B2 | 1/2013 | Wei et al. |
| 8,658,277 | B2 | 2/2014 | Wyndham et al. |
| 8,673,253 | B2 | 3/2014 | Chaumonnot et al. |
| 8,685,283 | B2 | 4/2014 | Wei et al. |
| 8,685,366 | B2 | 4/2014 | Chaumonnot et al. |
| 8,999,052 | B2 | 4/2015 | Yabe et al. |
| 9,080,056 | B2 | 7/2015 | Glennon et al. |
| 2007/0187313 | A1 | 8/2007 | Ekeroth |
| 2007/0189944 | A1 | 8/2007 | Kirkland et al. |
| 2008/0193734 | A1 | 8/2008 | Whitnall et al. |
| 2008/0269368 | A1 | 10/2008 | Wyndham et al. |
| 2010/0051877 | A1* | 3/2010 | Wei .................. B01J 20/08 252/408.1 |
| 2010/0213131 | A1 | 8/2010 | Linford et al. |
| 2010/0272996 | A1 | 10/2010 | Holmes et al. |
| 2011/0226990 | A1 | 9/2011 | Glennson et al. |
| 2013/0112605 | A1 | 5/2013 | Wyndham et al. |
| 2013/0206665 | A1 | 8/2013 | Wyndham et al. |
| 2013/0267629 | A1 | 10/2013 | Shimojima et al. |
| 2014/0159025 | A1 | 6/2014 | Fukuoka et al. |
| 2014/0329673 | A1 | 11/2014 | Ritchie et al. |
| 2014/0356272 | A1 | 12/2014 | Hyeon et al. |

FOREIGN PATENT DOCUMENTS

| | | |
|---|---|---|
| WO | WO 2010061367 | 8/2010 |
| WO | WO 2012018596 | 3/2012 |
| WO | WO 2012110995 | 8/2012 |

OTHER PUBLICATIONS

Gritti et al., "Comparative study of the performance of columns packed with several new fine silica particles. Would the external roughness of the particles affect column properties?" Journal of Chromatography A, Sep. 2007, pp. 30-46, vol. 1166, No. 1-2.

Henzte et al., "Silica hollow spheres by templating of catanionic vesicles" Langmuir, 2003, pp. 1069-1074, vol. 19, No. 4.

Hubert et al., "Vesicle-Directed Growth of Silica" Advanced Materials, Sep. 2000, pp. 1286-1290, vol. 12, Issue 17.

Kresge et al., "Ordered mesoporous molecular sieves synthesized by a liquid-crystal template mechanism" Nature, Oct. 1992, pp. 710-712, vol. 359.

Min et al., "Dandelion-like core-shell silica microspheres with hierarchical pores" RSC Adv, Mar. 2015, pp. 26269-26272, vol. 5.

Pevzner et al., "Evidence for Vesicle Formation during the Synthesis of Catanionic Templated Mesoscopically Ordered Silica as Studied by Cryo-TEM" J Am Chem Soc, 2003, pp. 652-653, vol. 125, No. 3.

Babin, Jerome et al., MCM-41 Silica Monoliths with Independent Control of Meso- and Macroporosity, New Journal of Chemistry, vol. 31, 2007, 1907-1917.

Beck, et al., A New Family of Mesoporous Molecular Sieves Prepared with Liquid Crystal Templates, J. Am. Chem. Soc., vol. 114, No. 27, 1992, 10834-10843.

Blin, et al., Investigation of the C16(EO)w/decane/water system for the design of porous silica materials, Colloids and Surfaces A: Physicochem. Eng. Aspects, vol. 308, 2007, 71-78.

Blin, et al., Investigation of the Silanols Groups of Mesostructured Silica Prepared Using a Fluorinated Surfactant: Influence of the Hydrothermal Temperature, American Chemical Society, vol. 111, 2007, 14380-14388.

Blin, et al., Pore Size Engineering of Mesoporous Silicas Using Decane as Expander, Langmuir, vol. 16, 2000, 4229-4236.

Blin, et al., Tailoring Pore Size of Ordered Mesoporous Silicas Using One or Two Organic Auxiliaries as Expanders, Langmuir, vol. 18, No. 13, 2002, 5303-5308.

Boissiere, Cedric et al., A double step synthesis of mesoporous micrometric spherical MSU-X silica particles, Chem. Commun., 1999, 2047-2048.

Boonamnuayvitaya, Virote et al., Synthesis and characterization of porous media produced by a sol-gel method, Chemical Engineering Science, vol. 61, 2006, 1686-1691.

Buchel, Gunter et al., A Novel Pathway for Synthesis of Submicrometer-Size Solid Core/Mesoporous Shell Silica Spheres, Communications, 1998, 3 pages.

Cassiers, K et al., A Detailed Study of Thermal, Hydrothermal, and Mechanical Stabilities of a Wide Range of Surfactant Assembled Mesoporous Silicas, Chem. Mater, vol. 14, No. 5, 2002, 2317-2324.

Chemin, N. et al., Mechanical properties of mesoporous silica thin films: Effect of the surfactant removal processes, Thin Solid Films, vol. 495, 2006, 210-213.

Chen, Cong-Yan et al., Studies on ordered mesoporous materials III. Comparison of MCM-41 to mesoporous materials derived from kanemite, Microporous Materials, 1995, 1-20.

Goltner-Spickermann, Christine et al, Non-ionic templating of silica: formation mechanism and structure, Current Opinion in Colloid & Interface Science, vol. 7, 2002, 173-178.

Hanrahan, John P. et al, Synthesis and swelling of large pore diameter mesoporous silica spheres, J. Mater. Chem., vol. 17, 2007, 3881-3887.

He, et al., Structural characteristic and thermal stability of nanoporous Si02 low-k thin films prepared by sol-gel method with catalyst HF, Materials Science and Engineering, 2006, 168-173.

Huo Qisheng et al., Surfactant Control of Phases in the Synthesis of Mesoporous Silica-Based Materials, Chem. Mater., vol. 8, No. 5, 1996, 1147-1160.

Jana, Suman K. et al., Pore size control of mesoporous molecular sieves using different organic auxiliary chemicals, Microporous and Mesoporous Materials, vol. 68, 2004, 133-142.

Jaroniec, et al., Tailoring Surface and Structural Properties of MCM-41 Silicas by Bonding Organosilanes, J. Phys. Chem. B, vol. 102, No. 28, 1998, 5503-5510.

Katiyar, Amit et al., Synthesis of ordered large pore SBA-15 spherical particles for adsorption of biomolecules, Journal of Chromatography A, 1122, 2006, 13-20.

Kim, Geon-Joong et al., Synthesis and Characterization of Co-Surfactant Tern plated Mesoporous Materials with Enhanced Hydrothermal Stability, Macromolecular Research, vol. 13, No. 6, 2005, 499-505.

Kong, Lingdong et al., Synthesis of hollow-shell MCM-48 using the ternary surfactant templating method, Microporom and Mesoporous Materials, vol. 81, 2005, 251-257.

Kruk, Michal et al., Determination of Pore Size and Pore Wall Structure of MCM-41 by Using Nitrogen Adsorption, Transmission Electron Microscopy, and X-ray Diffraction, J. Phys. Chem. 8, vol. 104, No. 1, 2000, 292- 301.

Kumar, D et al., MCM-41, MCM-48 and related mesoporous adsorbents: their synthesis and characterisation, Colloids and Surfaces A: Physicochemical and Engineering Aspects 187-188, 2001, 109-116.

Lin, Chi-Feng et al., Periodic mesoporous silicas via templating of new triblock amphiphilic copolymers, Microporous and Mesoporous Materials, vol. 91, 2006, 151-155.

Liu, Yi-Hsin et al., Direct Method for Surface Silyl Functionalization of Mesoporous Silica, Langmuir, American Chemical Society, 2004, 3231-3239.

Lu, Yunfeng et al., Aerosol-assisted selfassembly of mesostructured spherical nanoparticles, Nature, vol. 398, Mar. 18, 1999, 223-226.

Luo, Jen-Tsung et al., Mesoporous silica reinforced by silica nanopartides to enhance mechanical performance, Journal of Colloid and Interface Science, vol. 305, 2007, 275-279.

McGrath, et al., Formation of a Silicate L3 Phase with Continuously Adjustable Pore Sizes, Science, vol. 277, Jul. 25, 1997, 552-556.

(56) References Cited

OTHER PUBLICATIONS

Mesa, M et al., Micron-sized spherical core-shell particles of mesoporous silica suitable for HPLC applications, Studies in Surface Science and Catalysis, vol. 158, 2005, 2065-2072.

Minakuchi, Hiroyoshi et al., Octadecylsilylated Porous Silica Rods as Separation Media for Reversed-Phase Liquid Chromatography, Analytical Chemistry, vol. 68, No. 19, 1996, 3498-3501.

Mokaya, Robert et al., Improving the Stability of Mesoporous MCM-41 Silica via Thicker More Highly Condensed Pore Walls, J. Phys. Chem. B. vol. 103, No. 46, 1999, 10204-10208.

Muto, Shigeyuki et al., Relationship between mesostructures and pH conditions for the formation of silica-cationic surfactant complexes, Microporous and Mesoporous Materials, vol. 95, 2006, 200-205.

Nakamura, Tadashi et al., Formation Mechanism for Monodispersed Mesoporous Silica Spheres and Its Application to the Synthesis of Core/Shell Particles, J. Phys. Chem. C, vol. 111, No. 3, 2007, 1093-1100.

Nakanishi, Kazuki et al., Spontaneous Formation of Hierarchical Macro-Mesoporous Ethane-Silica Monolith, Chem Mater., vol. 16, No. 19, 2004, 3652-3658.

Nishiyama, Norikazu et al., Enhancement of structural stability of mesoporous silica via infiltration of $SnCl_4$ vapor, Journal of Non-Crystalline Solids, vol. 351, 2005, 3218-3224.

Ottaviani, Francesca M. et al., Synthesis of Micelle-Templated Silicas from Cetyltrimethylammonium Bromide/1,3,5-Trimethylbenzene Micelles, J. Phys. Chem. B, vol. 108, No. 32, 2004, 12123-12129.

Pauly, Thomas R. et al., Pore Size Modification of Mesoporous HMS Molecular Sieve Silicas with Wormhole Framework Structures, Chem. Mater., vol. 13. No. 3, 2001, 987-993.

Ramirez, A et al., Study of the Acidic Sites and Their Modifications in Mesoporous Silica Synthesized in Acidic Medium under Quiescent Conditions, J Phys. Chem. B, vol. 107, No. 3, 2003, 9275-9280.

Rao, Rama et al., Monodisperse Mesoporous Silica Microspheres Formed by Evaporation-Induced Self Assembly of Surfactant Templates in Aerosols, Adv. Mater, vol. 14, No. 18, Sep. 16, 2002, 1301-1304.

Sayari, Abdelhamid et al., Expanding the Pore Size of MCM-41 Silicas: Use of Amines as Expanders in Direct Synthesis and Postsynthesis Procedures, J. Phys. Chem. B. vol. 103, No. 18, 1999, 3651-3658.

Sayari, Abdelhamid et al., New Approaches to Pore Size Engineering of Mesoporous Silicates, Advanced Materials Communications, vol. 10, No. 16 (Germany), 1998, 1376-1379.

Schumacher, Kai et al., Characterization of MCM-48 Materials, Langmuir, vol. 16, No. 10, 2000, 4648-4654.

Shi, Zhi-Guo et al., Synthesis of a Silica Monolith with Textural Pores and Ordered Mesopores, Microporous and Mesoporous Materials, vol. 68, 2004, 55-59.

\* cited by examiner

SUPERFICIALLY POROUS PARTICLES WITH DUAL PORE STRUCTURE AND METHODS FOR MAKING THE SAME

INTRODUCTION

Superficially porous metal oxides, particularly silica particles are used in chromatography columns to separate mixed substances from one another, as well as in other applications. Such particles consist of a nonporous core with an outer porous shell. High pressure liquid chromatography ("HPLC") columns containing superficially porous silica particles have short mass transfer distances, resulting in fast mass transfer; and thus fast separation. Superficially porous particles have drawn great interest because of their special characteristics and improvement in separation efficiency. Superficially porous particles (SPPs) can be manufactured by adding silica nanoparticles onto solid cores either using a multilayer or one-step coacervation process. The pore size can be controlled by the size of the silica nanoparticles and the pore channel geometry determined by how those nanoparticles randomly aggregate. As a result, the porous shell has randomly distributed pores with wide pore size distribution. Moreover, the resulting rough external particle surfaces limit the performance of columns containing such particles at high flow rates by generating an unusually high film mass transfer resistance. Rough surfaces also limit the packing density because of increased friction forces among particles during the packing process (Gritti, et al., J. Chromatogr. A, 1166 (2007) 30-46).

Micelle-templated silica synthesis of totally porous silica particles through pseudomorphic transformation has been reported (see e.g. Martin, Angew. Chem. Int. Ed., 41 (2002) 2590). In contrast with the earlier techniques, where pores are randomly distributed, micelle-templated synthesis produces a more ordered pore framework involving preformed micellar structures via a liquid crystal templating mechanism (see, Kresge, Nature, 359, 710 and U.S. Pat. No. 5,057,296).

Pseudomorphism is a term used by mineralogists to describe phase transformation that does not change the shape of a material. Thus, the pseudomorphic synthesis mentioned here, assisted by a surfactant, for totally porous pre-shaped silica particles reportedly forms a highly ordered narrow mesopore size distribution, high surface area and pore volume without changing the initial shape of silica particles. The high specific surface area, high pore volume, and adjustable pore size should improve the retention capacity and molecular selectivity, as well as provide an overall improvement in mass transfer between the stationary and mobile phase.

Lefevre reportedly synthesized 10 µm totally porous silica particles with pore diameters ranging from 7 to 9 nm, specific surface areas of 900 $m^2/g$, and pore volumes of 1.5 ml/g (see, "Synthesis of Large-Pore Mesostructured Micelle-Templated Silicas as Discrete Spheres," Chem. Mater., 2005, 17, 601-607). The synthesis started with totally porous silica particles as a starting material in a sealed autoclave in a basic solution at above the boiling point of water from several hours to days, where the solution contained cetyltrimethylammonium bromide and a trimethyl benzene swelling agent. After the reaction, the micelle and swelling agents were removed by burning them off. However, Lefevre reported that large pore, totally porous silica particles with a particle size smaller than 8 µm cannot be made by this method due to particle aggregation. They also reported that particle explosion occurs if the pore volume of the totally porous silica starting material is too low. Thus, Lefevre's method starts with totally porous particles (pore volume larger than 0.7 $cm^3/g$) and produces totally porous particles with a more ordered pore structure and higher surface area than the starting material.

A variety of methods have been described for use in preparing totally porous materials using mixed surfactants via direct synthesis, e.g., synthesis of particles from unstructured chemical building blocks via a templated synthesis around particular micelles. Wang et al. (Materials Letters 142 (2105) 269-272) describe the templated preparation of hollow porous silica particles using mixed surfactants. The methods described produce hollow porous particles having limited pore sizes of about 2.4 nm. Lind et al. (Langmuir 2002, 18, 1380-1385) describe a direct synthesis method for preparing ordered silicate-surfactant composite materials using a mixture of cationic surfactant and a fatty acid as structure-directing agents. In general, the direct synthesis methods of the art produce particles that are porous throughout with a random or disordered arrangement of one type of pore with a limited range of possible pore sizes. Lind et al (Chem. Mater. 2003, 15, 813-818) describe the use of particular cationic and anionic surfactants as structure-directing agents in the preparation of porous silica. The described methods produce totally porous materials having pores with limited pore sizes in the range of 3 nm to 11 nm and randomly distributed vesicle-like structure.

Superficially porous particles having a solid core and an ordered porous layer where the pore structure includes a thinner outer shell thickness, ordered pore opening arrangement and aligned pore channels are perpendicular to the particle surface are described in U.S. Pat. No. 8,685,283. The columns packed with such superficially porous particles have greater efficiency for small molecule separation.

SUMMARY

Superficially porous particles are provided. Aspects of the superficially porous particles include a non-porous inner core and a porous outer shell that includes inner and outer porous regions. The inner porous region can include ordered cylindrical pores substantially perpendicular to the non-porous inner core. The outer porous region can include conical pores which extend to the surface of the particles and which are in fluid communication with the cylindrical pores of the inner porous region. Also provided are methods of making the subject superficially porous particles. Aspects of the methods include subjecting substantially solid inorganic oxide particles to agitation in an aqueous solution in the presence of a first cationic surfactant and a second anionic surfactant, which together form micelles, to pseudomorphically transform the particles. Kits and compositions for use in the subject methods are also provided.

BRIEF DESCRIPTION OF THE FIGURES

The skilled artisan will understand that the drawings, described below, are for illustration purposes only. The drawings are not intended to limit the scope of the present teachings in any way.

DEFINITIONS

Figure 1:
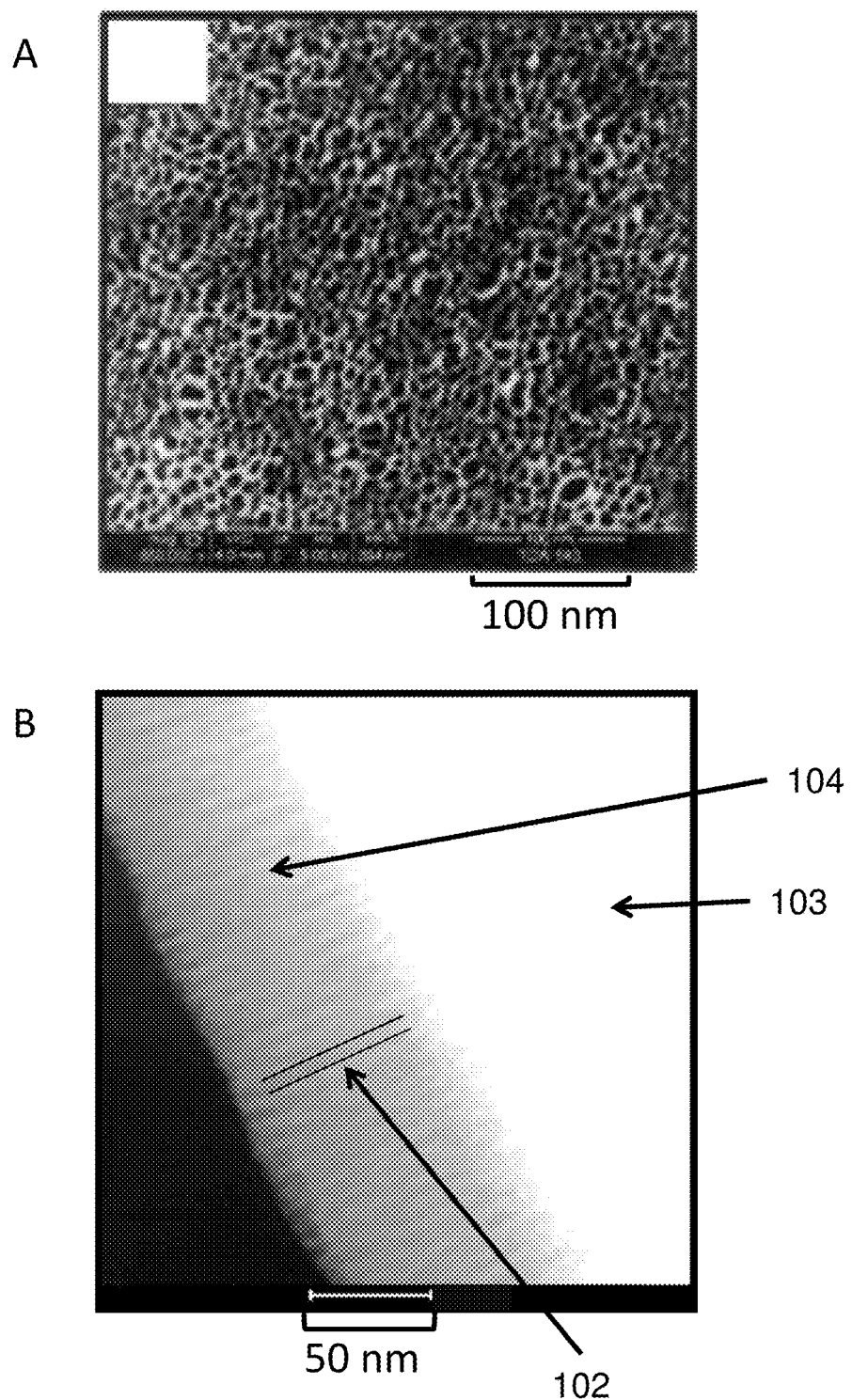
FIG. 1, panels A-B, show a high resolution scanning electron microscope (HRSEM) surface image and a transition electron microscope (TEM) cross sectional image of a superficially porous particle prepared according to the methods of U.S. Pat. No. 8,685,283. The images show cylindrical pore openings (panel A) and a cross-sectional view of cylindrical pores (102) in a porous shell (104) showing pore orientation normal to the particle surface and the non-porous core (103). The porous shell of the particle shown includes a uniform region of ordered cylindrical pores.

Before describing exemplary embodiments in greater detail, the following definitions are set forth to illustrate and define the meaning and scope of the terms used in the description.

Following long-standing patent law convention, the terms "a", "an", and "the" refer to "one or more" when used in this application, including the claims. Thus, for example, reference to "a cell" includes a plurality of such cells, and so forth.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Unless defined otherwise, all technical and scientific terms used herein have the same meaning as commonly understood by one of ordinary skill in the art to which this invention belongs. Singleton, et al., DICTIONARY OF MICROBIOLOGY AND MOLECULAR BIOLOGY, 2D ED., John Wiley and Sons, New York (1994), and Hale & Markham, THE HARPER COLLINS DICTIONARY OF BIOLOGY, Harper Perennial, N.Y. (1991) provide one of skill with the general meaning of many of the terms used herein. Still, certain terms are defined below for the sake of clarity and ease of reference.

The methods described herein include multiple steps. Each step can be performed after a predetermined amount of time has elapsed between steps, as desired. As such, the time between performing each step can be 1 second or more, 10 seconds or more, 30 seconds or more, 60 seconds or more, 5 minutes or more, 10 minutes or more, 60 minutes or more and including 5 hours or more. In certain embodiments, each subsequent step is performed immediately after completion of the previous step. In other embodiments, a step can be performed after an incubation or waiting time after completion of the previous step, e.g., a few minutes to an overnight waiting time.

Numeric ranges are inclusive of the numbers defining the range.

The term "separating", as used herein, refers to physical separation of two elements (e.g., by size or affinity, etc.) as well as degradation of one element, leaving the other intact.

The terms "derivatized" and "modified" refers to chemical modification of molecules. The skilled artisan would readily recognize the variety of ways molecules can be modified, such as oxidations, reductions, electrophilic/nucleophilic substitutions, alkylations, ester/amide formations and the like. For example, particles of the present disclosure can be chemically modified by silation.

The term "sample" as used herein relates to a material or mixture of materials, in some cases, in fluid, e.g., aqueous, form, containing one or more components of interest. Samples may be derived from a variety of sources such as from food stuffs, environmental materials, a biological sample or solid, such as tissue or fluid isolated from an individual, including but not limited to, for example, plasma, serum, spinal fluid, semen, lymph fluid, the external sections of the skin, respiratory, intestinal, and genitourinary tracts, tears, saliva, milk, blood cells, tumors, organs, and also samples of in vitro cell culture constituents (including but not limited to conditioned medium resulting from the growth of cells in cell culture medium, putatively virally infected cells, recombinant cells, and cell components).

Components in a sample are termed "analytes" herein. In many embodiments, the sample is a complex sample containing at least about $10^2$, $5 \times 10^2$, $10^3$, $5 \times 10^3$, $10^4$, $5 \times 10^4$, $10^5$, $5 \times 10^5$, $10^6$, $5 \times 10^6$, $10^7$, $5 \times 10^7$, $10^8$, $10^9$, $10^{10}$, $10^{11}$, $10^{12}$ or more species of analyte.

The term "analyte" are used herein interchangeably and refer to a known or unknown component of a sample. In some cases, analytes are biopolymers, i.e., an oligomer or polymer such as an oligonucleotide, a peptide, a polypeptide, an antibody, or the like. In some cases, an "analyte" is referenced as a moiety in a mobile phase (typically fluid), to be separated by chromatography using the subject particles.

The terms "polypeptide" and "protein", used interchangeably herein, refer to a polymeric form of amino acids of any length, which can include coded and non-coded amino acids, chemically or biochemically modified or derivatized amino acids, and polypeptides having modified peptide backbones. The term "fusion protein" or grammatical equivalents thereof is meant a protein composed of a plurality of polypeptide components, that while typically unjoined in their native state, typically are joined by their respective amino and carboxyl termini through a peptide linkage to form a single continuous polypeptide. Fusion proteins may be a combination of two, three or even four or more different proteins. The term polypeptide includes fusion proteins, including, but not limited to, fusion proteins with a heterologous amino acid sequence, fusions with heterologous and homologous leader sequences, with or without N-terminal methionine residues; immunologically tagged proteins; fusion proteins with detectable fusion partners, e.g., fusion proteins including as a fusion partner a fluorescent protein, β-galactosidase, luciferase, etc.; and the like.

In general, polypeptides may be of any length, e.g., greater than 2 amino acids, greater than 4 amino acids, greater than about 10 amino acids, greater than about 20 amino acids, greater than about 50 amino acids, greater than about 100 amino acids, greater than about 300 amino acids, usually up to about 500 or 1000 or more amino acids. "Peptides" are generally greater than 2 amino acids, greater than 4 amino acids, greater than about 10 amino acids, greater than about 20 amino acids, usually up to about 50 amino acids. In some embodiments, peptides are between 5 and 30 amino acids in length.

By "pseudomorphic transformation" or "pseudomorphically transform," is meant process conditions that allow for non-porous particles to be dissolved on their surfaces as the solid surface is being replaced with a superficially porous shell at the same time such that the final superficially porous particles keep the same general size as the original solid particles, and thus retain the substantially monodispersed characteristic of the original starting material solid particles after pseudomorphic synthesis. A method of porous particle preparation based on pseudomorphic transformation (PMT) is further distinguished from a templated direct synthesis method at least by the nature of the starting material, e.g., a non-porous particulate starting material versus a chemical reagent, e.g., a monomeric reagent such as tetraethylorthosilicate. In a direct synthesis method, the particles of composition can be formed around the micelles from unstructured chemical building blocks.

As used herein, the terms micelle and vesicle are used interchangeably and refer to an aggregate of surfactant molecules. A surfactant refers to a molecule that includes both a hydrophilic region or head group and a hydrophobic region or tail. The hydrophilic region can be neutral (e.g., non-ionic) or charged (e.g., ionic). When charged, the hydrophilic region can include a cationic group or an anionic group. In some cases, the hydrophobic tail is a linear hydrocarbon chain, e.g., the chain of a lipid or fatty acid. In general terms, in an aqueous solution, the hydrophilic regions of the surfactant molecules are arranged at the surface of the aggregate and in contact with the surrounding solution, while the hydrophobic regions of the surfactant molecules are aggregated together in the center of the aggregate. In some cases, micelles are spherical in shape. As used herein, the term catanionic refers to a micelle that includes an arrangement of both cationic and anionic surfactants in the aggregate.

Other definitions of terms can appear throughout the specification.

DETAILED DESCRIPTION

Before the various embodiments are described, it is to be understood that the teachings of this disclosure are not limited to the particular embodiments described, and as such can, of course, vary. It is also to be understood that the terminology used herein is for the purpose of describing particular embodiments only, and is not intended to be limiting, since the scope of the present teachings will be limited only by the appended claims.

The section headings used herein are for organizational purposes only and are not to be construed as limiting the subject matter described in any way. While the present teachings are described in conjunction with various embodiments, it is not intended that the present teachings be limited to such embodiments. On the contrary, the present teachings encompass various alternatives, modifications, and equivalents, as will be appreciated by those of skill in the art.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

The citation of any publication is for its disclosure prior to the filing date and should not be construed as an admission that the present claims are not entitled to antedate such publication by virtue of prior invention. Further, the dates of publication provided can be different from the actual publication dates which can be independently confirmed.

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

All patents and publications, including all sequences disclosed within such patents and publications, referred to herein are expressly incorporated by reference.

Superficially Porous Particles

Figure 9:
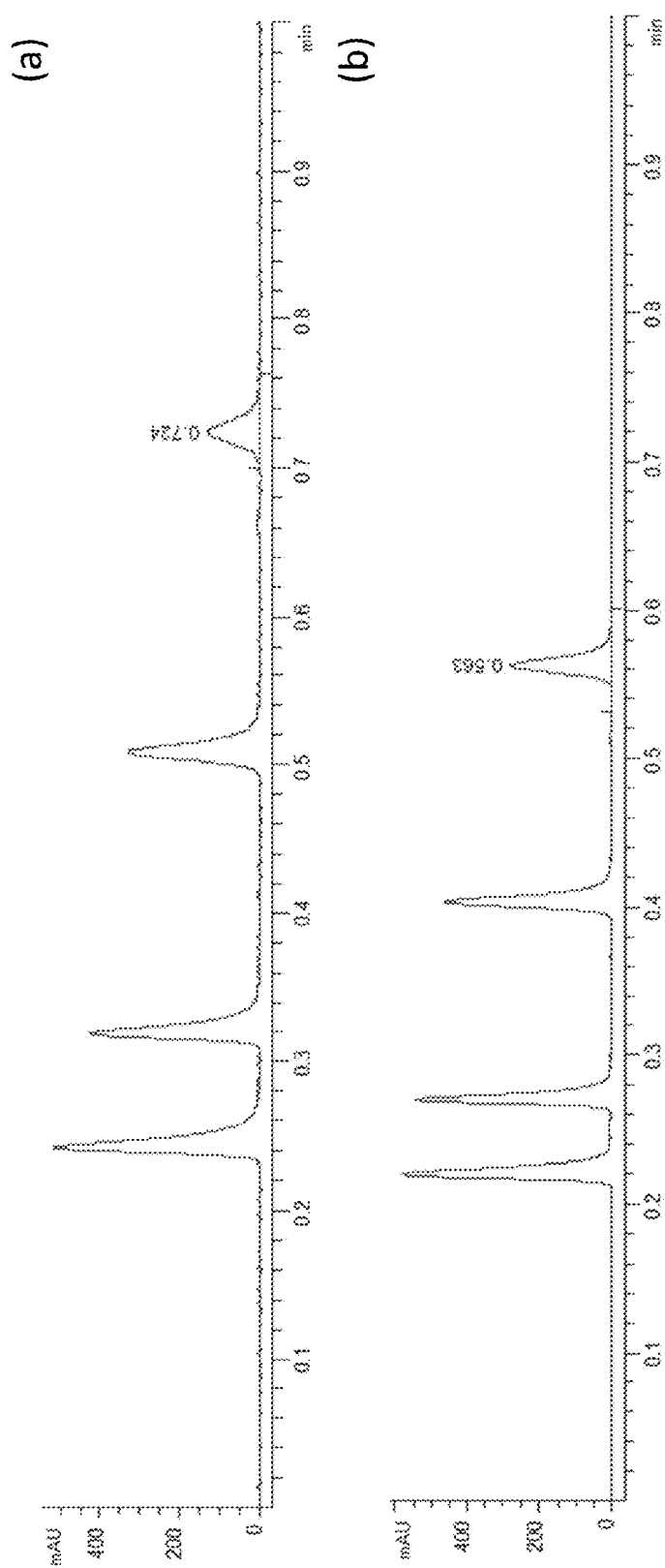
FIG. 9, panel (a)-(b) shows HPLC chromatograms comparing small molecule separations achieved using an Agilent Poroshell 120 column consisting of a 2.7 um core shell particle with 120 Å pores (a) versus a column including exemplary superficially porous particles of the present disclosure (b).
Figure 10:
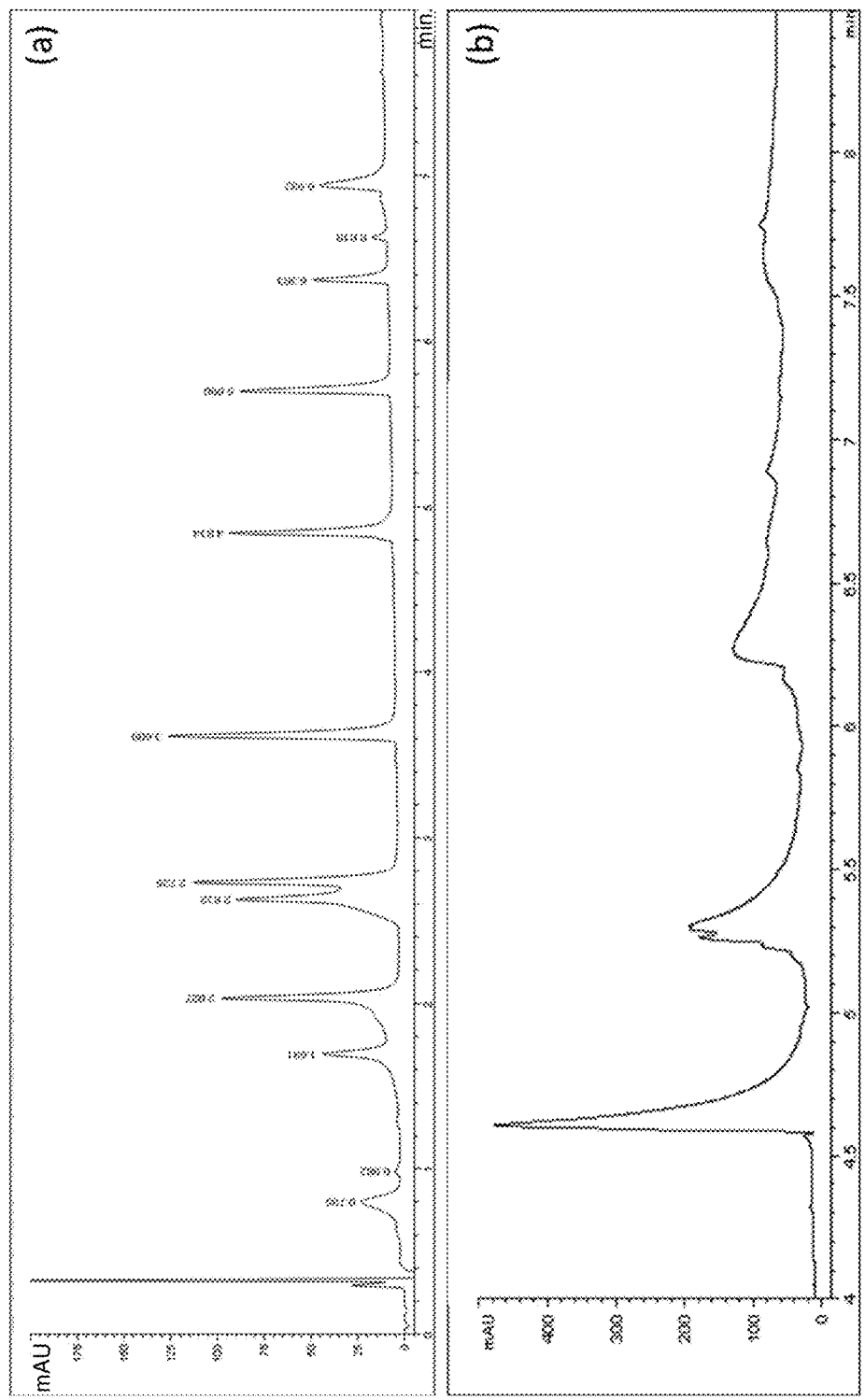
FIG. 10, panels (a)-(b), show HPLC chromatograms comparing the separation achieved for a mixture of peptides (panel a) and a mixture of proteins (panel b) using particles that lack the dual pore structure of the subject particles.

Superficially porous particles having a solid core and an ordered porous layer where the pore opening arrangement and aligned pore channels are perpendicular to the particle surface (FIG. 1) are described in U.S. Pat. No. 8,685,283, the disclosure of which is herein incorporated by reference. The columns packed with such superficially porous particles have greater efficiency for small molecule separation. However, it is found that these particles have poor separation performance for larger molecules such as peptides and proteins. As shown in FIG. 9, panel (b), when used in the separation of a mixture of proteins, such a column produces a chromatogram having peaks that are either fronting or tailing with broad peak width. The main reason for this relatively poor separation of proteins is that the particles are designed for small molecule separation, in some cases, with an ordered pore size of about 80 to 100 angstroms. Large molecules such as peptides or proteins have difficulty diffusing into or through these highly ordered pore channels having narrow sizes. In general, particles are usually designed with customized pore sizes and surface areas for specific applications that are tailored towards one size of analyte. For example, particles with pore sizes of 300 angstroms or larger are designed for protein separation. So far there is no single particle that is capable of achieving effective separations of a variety of analytes from small molecules to large proteins which span a wide range of MWs.

The present disclosure provides superficially porous particles having a dual pore structure that can be used to separate a broad range of molecular weight analytes from small molecules to proteins. In some cases, both proteins having molecular weights up to 500 kDa and small peptides and small molecules, e.g., 1000 kDa or less can be separated from each other from a complex mixture of analytes. Aspects of the present disclosure include methods for controlling the size and shape of the pore openings of the particles using catanionic vesicles and, in some cases, additional swelling agents or surfactants, during preparation of the particles via pseudomorphic transformation. Mixtures of distinct surfactants (e.g., cationic+anionic) can be used to create micelles having two distinct sizes. In some cases, the micelles are created in a one-step process. In certain cases, the micelles are created in a two-step process. As used herein, the term catanionic refers to a micelle that includes an arrangement of both cationic and anionic surfactants. As used herein, the term micelle and vesicle are used interchangeably. The subject particles can be prepared using a micelle-templated pseudomorphic synthesis where a first micelle (e.g., cationic surfactant+optional swelling agent) is used to create an inner cylindrical pore structure and a second micelle (e.g., a catanionic vesicle) is used to create a distinct outer conical pore structure. The inner and outer porous regions of the porous shell are in fluid communication such that analytes can interact with both regions.

Figure 2:
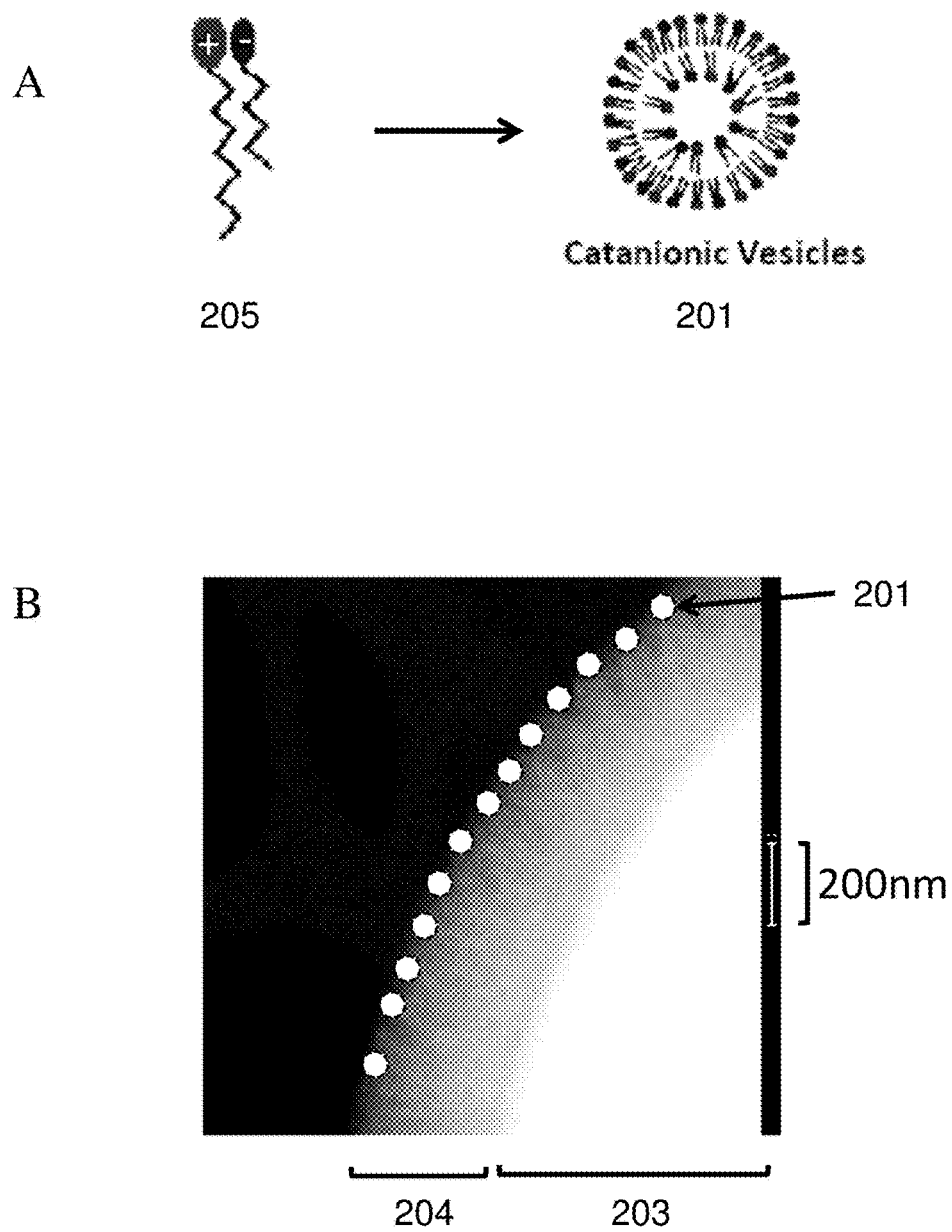
FIG. 2, panels A-B, illustrate the use of mixed cationic and anionic surfactants to form catanionic vesicles at the interface of the superficially porous particle and solution during preparation. Panel A depicts a schematic of the formation of a catanionic vesicle (201) from a mixture of cationic and anionic surfactants (205). Panel B shows a cross-sectional image of a superficial porous particle including a non-porous inner core (203) and a porous outer shell (204), indicating the positioning of the catanionic vesicles (201) at the surface of the porous outer shell during preparation.

In some instances, in a first step of the subject methods, a cationic surfactant (e.g., cetyltrimethylammonium bromide, CTAB) and core slurry (e.g., non-porous particles of an inorganic oxide) are mixed at high pH and high temperature to form an ordered cylindrical pore structure around the non-porous inner core. In the subject particles, the cylindrical pore structure forms an inner porous region of the porous shell. In some cases, certain amounts of a swelling agent (e.g., trimethyl benzene) can be added in a second step. In some cases, a mixture of cationic and anionic surfactants in used which form large catanionic vesicles. FIG. 2, panel (a) depicts a schematic of catanionic vesicle formation, and panel (b) shows the positioning of the vesicles at the surface of the porous outer shell during the preparation of conical pores. The size of the catanionic vesicle can be controlled by a variety of factors such as the selection of cationic and anionic surfactants used, the particular ratio of surfactants, additional swelling agents, etc. The catanionic vesicles can be utilized in the pseudomorphic transformation of the particle to produce a further outer porous region having larger conical pores which are distinct from the ordered cylindrical pores of the inner porous region. During this step of the method, the porous shell can keep growing with newly formed pore openings (e.g., conical pores) larger than those formed in the first step (e.g., ordered cylindrical pores).

In some embodiments, a one-step process is used to create micelles having two distinct sizes, where the smaller micelle is utilized to form the inner cylindrical pores and the larger micelle is utilized to form the outer conical pores. The smaller micelle can be composed of cationic surfactant with optional swelling agent. The cationic surfactant can interact with the surface of the non-porous core, in some cases, silica. The larger micelles are catanionic and include both cationic and anionic surfactants, with an optional swelling agent. Both types of micelles can be formed in a one-step process by selecting a convenient ratio of cationic to anionic surfactant. In some instances, the cationic surfactant is present in a molar excess over the anionic surfactant.

Figure 3:
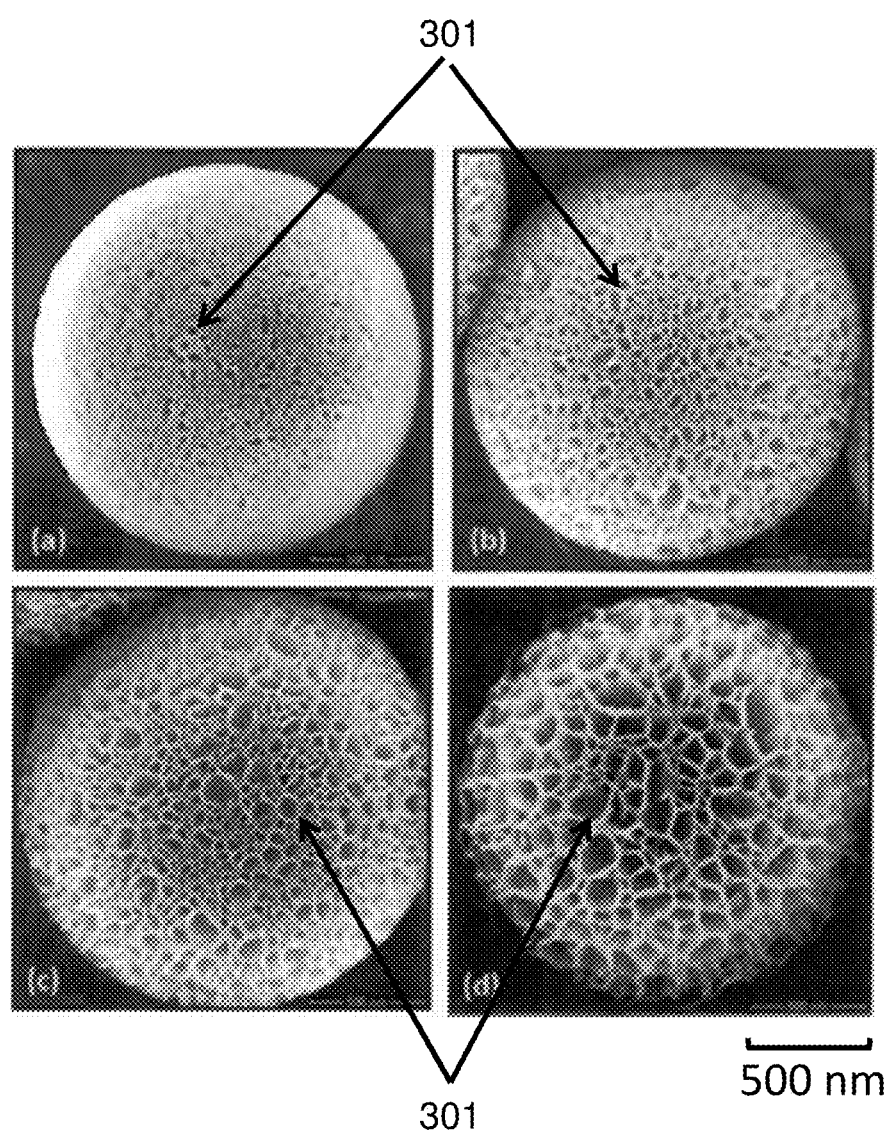
FIG. 3, panels (a)-(d), show HRSEM images of exemplary particles illustrating the control of conical pore sizes in the outer porous region of the superficially porous particles provided by the subject methods. The conical pore openings (301) can be tuned by the amount of a swelling agent and/or a surfactant utilized with the catanionic vesicles during preparation of the particles and provides for a variety of conical pore sizes (301) in the outer porous region of the particles. The size of the largest pore opening in the surface images is 300, 500, 1000 and 2500 angstrom from panels A to D, respectively.
Figure 4:
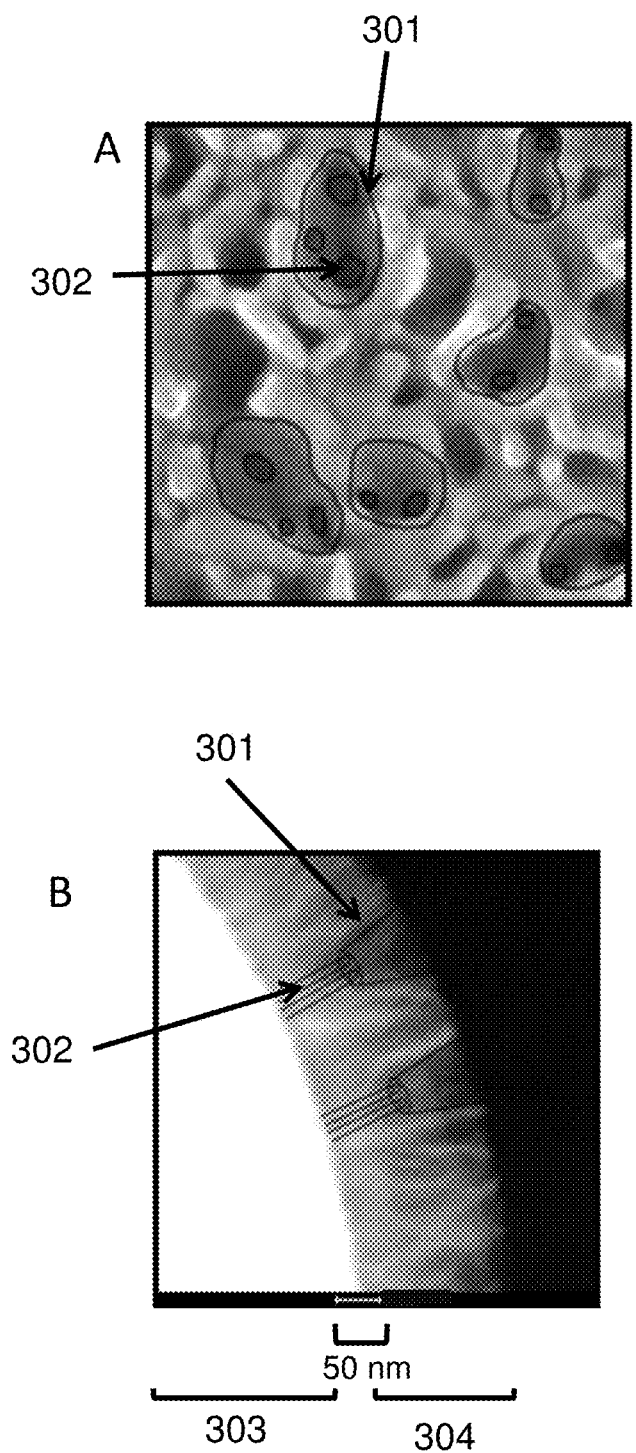
FIG. 4, panels A-B, show surface and cross-sectional images of an exemplary superficially porous particle including an overlaid schematic markings on the conical pores (301) and the cylindrical pores (302) in fluid connection within the porous outer shell (304) around the solid non-porous inner core (303) of the particle.

The conical pores of the outer porous region are depicted in FIG. 4, panel B (301). The conical pores are in fluid communication with the ordered cylindrical pores (302) of the inner porous region, as shown in FIG. 4, panel A where the surface image shows multiple cylindrical pore openings (302) at the bottom of the conical pores (301). In general, the conical pores have a large pore opening which narrows from the surface to the beginning of the inner porous region. The conical pores can be characterized and described in any convenient way, such as by pore opening size (e.g., FIG. 3, panels (a)-(d), e.g., largest or median pore opening), by median pore size or by mean pore size. In some instances, the median conical pore size (e.g., diameter) is at least 50% larger than the median cylindrical pore size (such as at least 2-fold, at least 3-fold, at least 5-fold, at least 6-fold, at least 7-fold, at least 8-fold, at least 9-fold, at least 10-fold, at least 30-fold, at least 100-fold larger, etc.). In certain instances, the median conical pore size is at least 100 Å larger than the median cylindrical pore size, such as at least 200 Å larger, at least 300 Å larger, at least 400 Å larger, at least 500 Å larger, at least 600 Å larger, at least 700 Å larger, at least 800 Å larger or at least 1000 Å larger. In certain cases, the subject superficially porous particles have a conical median pore size (e.g., diameter) in the range from about 150 to about 2500 Å, such as from about 150 to about 2000 Å, from about 150 Å to about 1500 Å, from about 150 Å to about 1000 Å, from about 150 Å to about 800 Å, or from about 200

Å to about 2500 Å, or such as from about 200 to about 2000 Å, from about 200 Å to about 1500 Å, from about 200 Å to about 1000 ÅA, from about 200 Å to about 800 Å, or from about 300 Å to about 2500 Å, from about 300 Å to about 2000 Å, from about 300 Å to about 1500 Å, from about 300 Å to about 1000 Å, or from about 300 Å to about 800 Å. In some cases, the conical median pore size is from about 300 Å to about 2500 Å. In some cases, the conical median pore size is from about 400 Å to about 2500 Å. In some cases, the conical median pore size is from about 500 Å to about 2500 Å. In some cases, the conical median pore size is from about 600 Å to about 2500 Å. In some cases, the conical median pore size is from about 700 Å to about 2500 Å. In some cases, the conical median pore size is from about 800 Å to about 2500 Å. In some cases, the conical pores have a wide pore size distribution, e.g., a pore size distribution defined by a mean diameter and one standard deviation. In some cases, by wide pore size distribution is meant a pore size (e.g., diameter) distribution having a standard deviation that is ±50% or more (e.g., ±60% or more, ±70% or more, ±80% or more, ±100% or more, ±100% or more, or even more) of the mean pore size.

Figure 5:
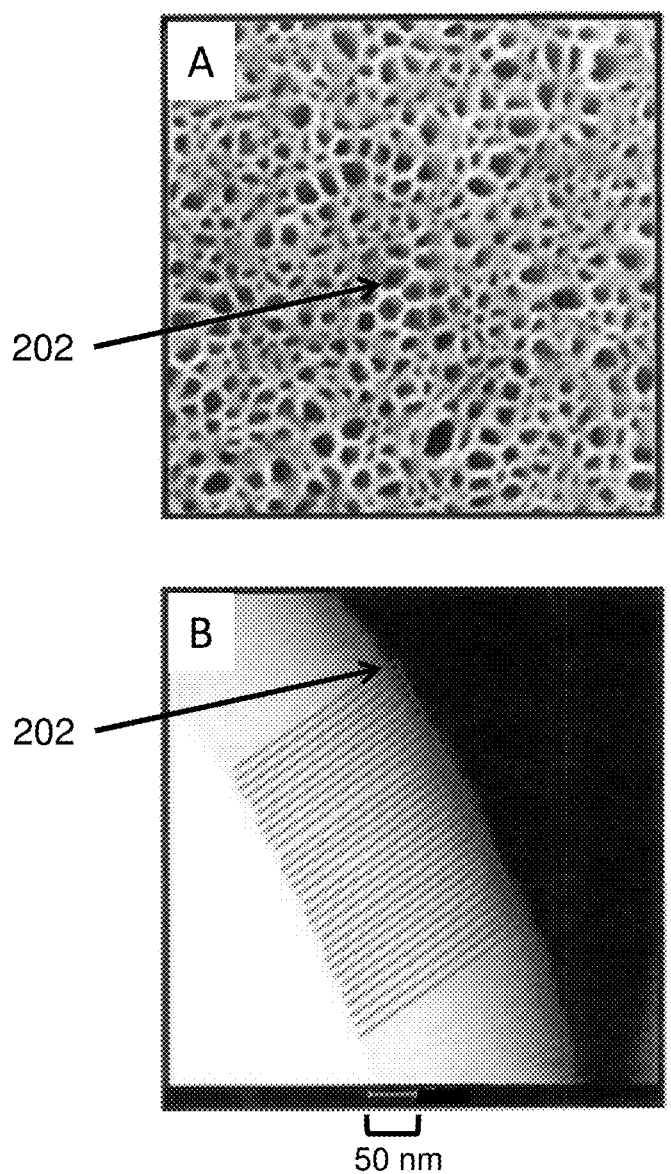
FIG. 5, panels A-B, show cylindrical pore opening (A) and cylindrical pore cross-sectional view of a superficially porous particle prepared according to the methods of U.S. Pat. No. 8,685,283 which lacks conical pores in the outer region of the porous outer shell.
Figure 6:
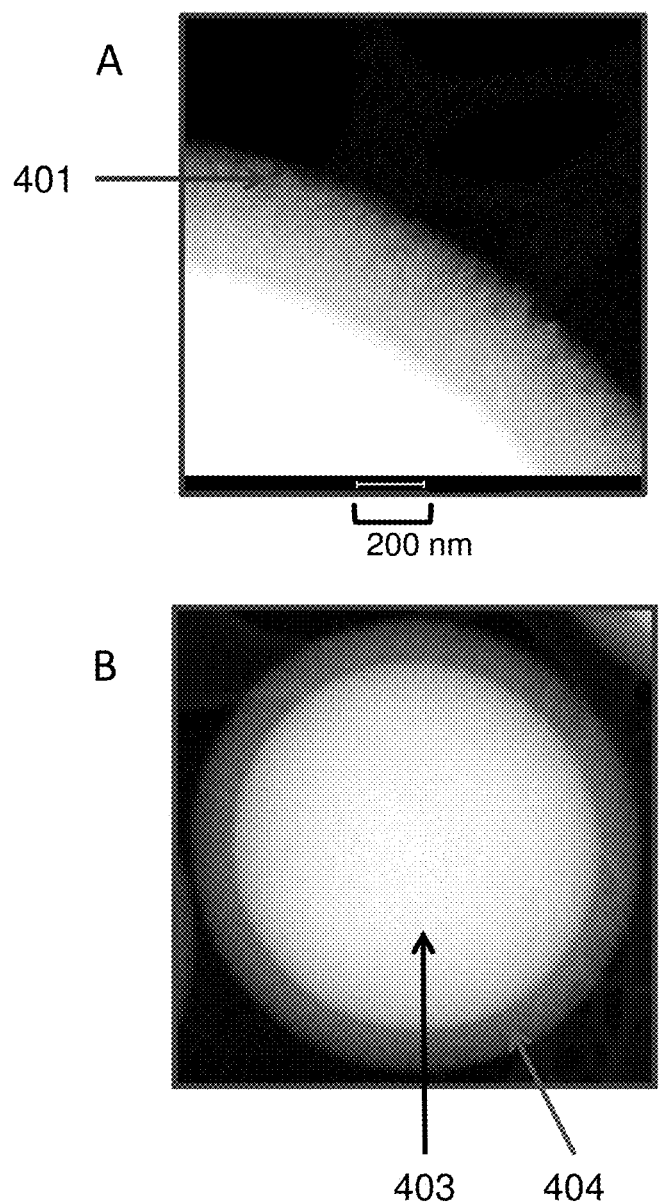
FIG. 6, panels A-B, show cross-sectional images of an exemplary superficially porous particle. Panel A shows conical pores (401) having a shallower depth in the porous outer shell (404) relative to the conical pores of the exemplary particle of FIG. 4, panels A-B, indicating that the size and depth of the conical pores can be controlled using the subject methods of preparation. Panel B shows the porous outer shell (404) around a solid non-porous inner core (403).

The cylindrical pores of the inner porous region are depicted in FIG. 4, panel B (302). In addition, FIG. 5, panels A and B depict cylindrical pores and pore openings (202) of a superficially porous particles without an outer porous region of conical pores. In general the cylindrical pores are narrow, elongated and ordered substantially perpendicular the non-porous inner core of the particle. In some cases, the inner porous region having the cylindrical pores can be referred to as an ordered mesoporous region. A mesoporous material is a material containing pores with diameters between 2 and 50 nm. In certain cases, the subject superficially porous particles have a cylindrical median pore size (e.g., diameter) in the range from about 15 to about 1000 Å, such as from about 50 to about 1000 Å, from about 50 Å to about 800 Å, from about 50 Å to about 500 Å, from about 50 Å to about 300 Å, from about 50 Å to about 250 Å, from about 50 Å to about 200 Å, from about 70 Å to about 200 Å, from about 70 Å to about 150 Å, or from about 50 Å to about 100 Å, or such as from about 60 to about 1000 Å, from about 60 Å to about 800 Å, from about 60 Å to about 500 Å, from about 60 Å to about 300 Å, from about 60 Å to about 250 Å, from about 60 Å to about 200 Å, or from about 60 Å to about 150 Å. In some cases, the cylindrical median pore size is from about 50 Å to about 300 Å. In some cases, the cylindrical median pore size is from about 60 Å to about 300 Å. In some cases, the cylindrical median pore size is from about 50 Å to about 250 Å. In some cases, the cylindrical median pore size is from about 60 Å to about 250 Å. In some cases, the cylindrical median pore size is from about 50 Å to about 200 Å. In some cases, the cylindrical median pore size is from about 60 Å to about 200 Å. In some cases, the cylindrical median pore size is from about 70 Å to about 200 Å. In some cases, the cylindrical median pore size is from about 70 Å to about 150 Å. In some cases, the cylindrical median pore size is from about 50 Å to about 100 Å. The cylindrical pores can have a narrow pore size distribution, e.g., a pore size distribution defined by a mean diameter and one standard deviation. In some cases, by narrow pore size distribution is meant a pore size distribution having a standard deviation that is ±50% or less (e.g., ±40% or less, ±30% or less, ±20% or less, ±10% or less, etc.) of the mean cylindrical pore size (e.g., diameter).

The outer pore size can be also tuned by the quantities of anionic surfactants used. For example, high resolution scanning electron microscope imaging shows that the subject particles can be tailored to have conical pore openings from 300 Å to 2500 Å (FIG. 3, panels (a)-(d)) via the use of different amounts of anionic surfactants. The dual pore structure can also be observed by transmission electron microscope imaging of the particles where funnel-like pore openings are on top of many smaller straight channels in cross-section view (FIG. 4, panels A and B). Pore expansion treatment such as hydrothermal method or etching can be applied to further tune the dual pore sizes. In some cases, a strengthening treatment such as high temperature sintering can be applied to further strengthen the subject particles.

It is understood that a variety of methods (e.g., as described herein) can be used in characterizing the subject particles. Particle characterization measurements can be collected on a single particle or on a plurality of particles in a composition. Multiple particle characterization measurements can be collected on a single particle or on a plurality of particles to arrive at a distribution from which any convenient statistical metrics can be calculated. Any convenient methods for measuring and characterizing a particle or a composition of a plurality of particles can be utilized in conjunction with the subject particles and methods.

Figure 7:
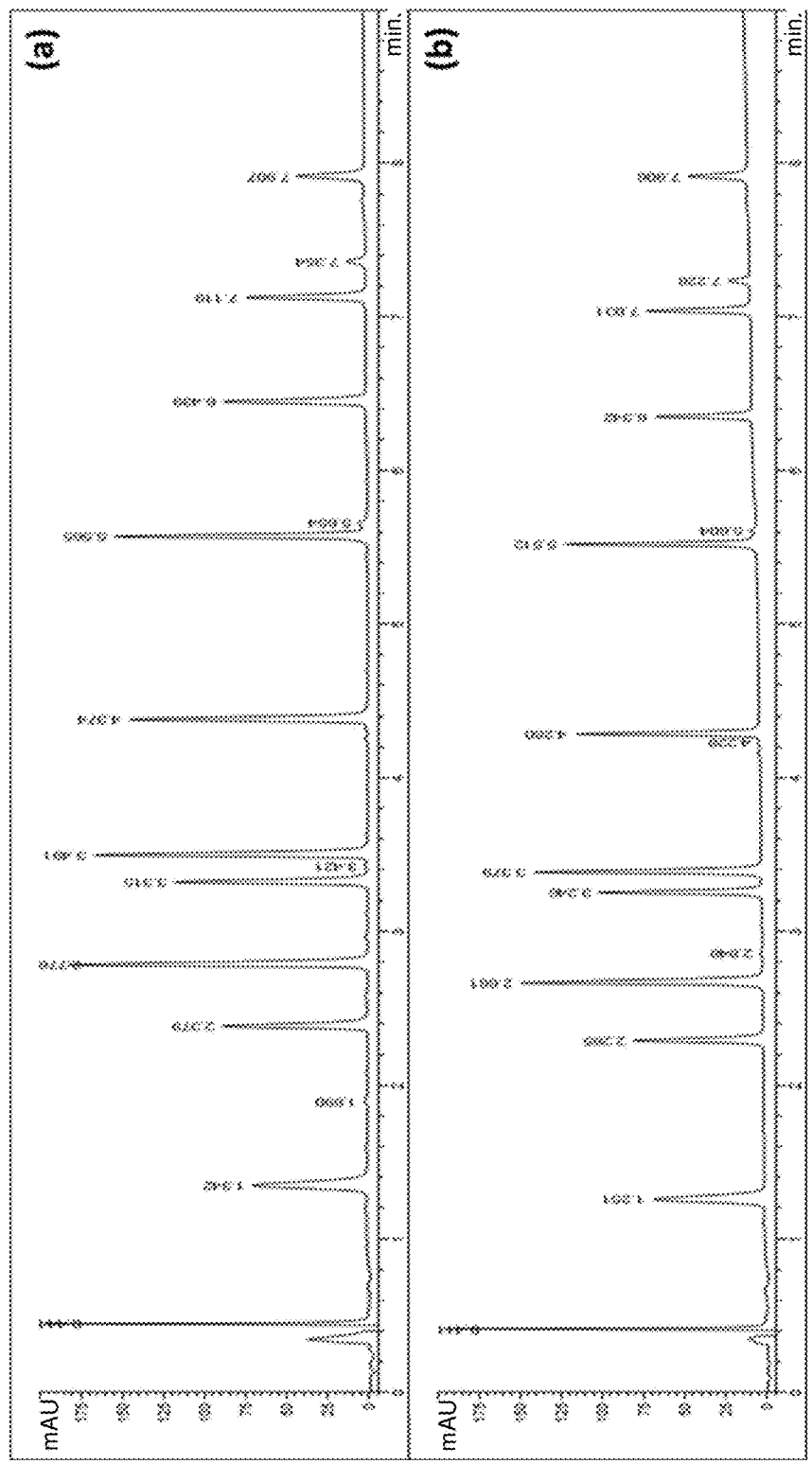
FIG. 7, panels (a)-(b) shows HPLC chromatograms comparing peptide separations achieved using an Agilent AdvanceBio peptide mapping column consisting of a 2.7 um core shell particle with 120 Å pores (a) versus a column including exemplary superficially porous particles of the present disclosure (b).
Figure 8:
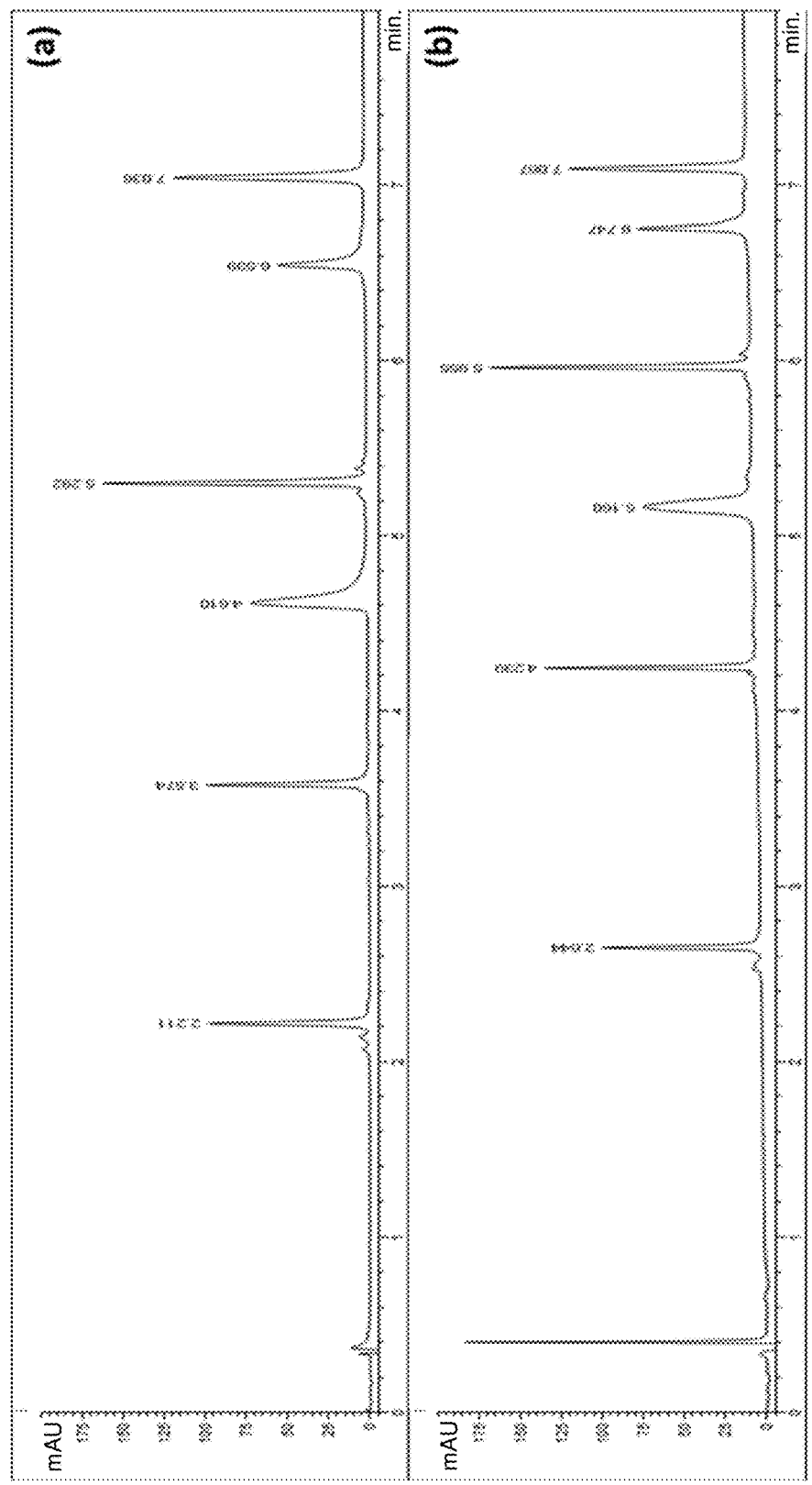
FIG. 8, panels (a)-(b), shows HPLC chromatograms comparing protein separations achieved using an Agilent AdvanceBio RP-mAb column consisting of a 3.5 um core shell particle with 450 Å pores (a) versus a column including exemplary superficially porous particles of the present disclosure (b).

With this dual pore structure, the particles can be used to separate not only small molecules but also peptides (FIG. 7) and proteins (FIG. 8). The big conical pores provide interaction with large molecules in the outer region of the porous shell while small cylindrical pores interact with small molecules in the inner region. In some cases, a narrow particle size distribution and thin porous shell provides fast and high efficiency separation among all size ranges. The subject method can also be applied to hybrid cores to form superficially porous hybrid particles. The subject methods and particles provide for fast separations over a wide pH range with ultra-high efficiency for a broad size range of analytes.

Aspects of the present disclosure further include the superficially porous particles themselves described above. In addition to the above, the particles can have solid cores having a size ranging from about 50% to about 90% of the size of the entire particles, in some cases, from about 60% to about 80% of the size of the entire particles. In some cases, the superficially porous particles of this invention have a particle size distribution (one standard deviation) of 40% or less of the median particle size, such as 30% or less, 20% or less, 10% or less, or 5% or less of the median particle size. In some cases, the superficially porous particles of this invention have a narrow particle size distribution defined by a mean and standard deviation, where the standard deviation is 40% or less of the mean particle size, such as 30% or less, 20% or less, 10% or less, or 5% or less of the mean particle size.

In some instances, the subject superficially porous particles have a median size from about 0.5 µm to about 10 µm, such as from about 1.0 µm to about 5 µm. In certain cases, the superficially porous particles have a specific surface area of the particles that is from about 5 m$^2$/g to about 300 m$^2$/g. In some cases, the particles have a median particle size from about 0.5 µm to about 100 µm and a particle size distribution of no more than 15% of the median or mean size, in some cases, a particle size distribution of no more than 10% of the median or mean size, and in certain cases a distribution of no more than 5% of the median or mean size. In some cases, the superficially porous particles have non-porous (e.g., solid) cores having a size ranging from about 50% to about 90% of the size of the entire particles, most preferably from about 60% to about 80% of the size of the entire particles.

Figure 11:
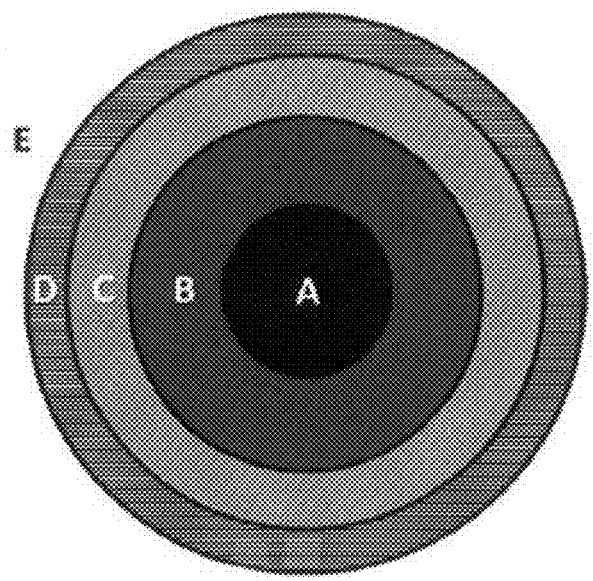
FIG. 11 shows a schematic cross-section of an exemplary superficially porous particle, where layers A-E can include a variety of material. For example, A: Either hollow core or solid core comprising inorganic or inorganic/organic metal oxide or polymeric or magnetic materials; B: a second solid layer comprise inorganic or inorganic/organic metal oxide or polymeric or magnetic materials; C: a substantially porous outer shells comprise inorganic or inorganic/organic metal oxide; D: a second porous outer shells comprise inorganic or inorganic/organic metal oxide; and E: a coated layer on the surface of pore channels comprise inorganic or inorganic/organic metal oxide or polymeric materials.

The subject particles can include hybrid materials. One or more of the various regions of the subject particles can include hybrid material. For example, FIG. 11 shows a schematic cross-section of an exemplary superficially porous particle, where layers A-E can include a variety of such materials. By "hybrid" is meant that both an organic and an inorganic (e.g., inorganic oxide) material are utilized together.

In some instances, the superficially porous particles include an organic metal oxide having a composition selected from formulae XI and XII:

$$MO_2/(R^1_pR^1_qMO_t)_n \quad (XI)$$

$$MO_2/[R^2(R^1_rMO_t)_m]_n \quad (XII)$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is Si, Ti, or Zr. In some cases, in formulae XI and XII, M is Si and in that case $R^1$ and $R^2$ are preferably independently methyl, or ethyl, $R^3$ is methylene, ethylene or 1,2-benzylene. In certain instances, in formulae XI and XII M can be Ti or Zr.

The superficially porous particles can also comprise an organic metal oxide having a composition selected from one or both of the formulae XIII and XIV:

$$Al_2O_3/(R^1AlO)_n \quad (XIII)$$

$$Al_2O_3/[R^2(AlO)_m]_n \quad (XIV)$$

wherein $R^1$ is a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more metal atoms; m is an integer greater than or equal to 2; and n is a number from 0.01 to 100.

The superficially porous particles can comprise an organic metal oxide having a composition selected from one or more of formulae XVI-XIX:

$$MO_2/(R^1_pR^1_qMO_t)_x/(R^1_pR^1_qMO_t)_y \quad (XVI)$$

$$MO_2/(R^1_pR^1_qMO_t)_x/[R^2(R^1_rMO_t)_m]_y \quad (XVII)$$

$$MO_2/[R^2(R^2_rMO_t)_m]_x/(R^1_pR^1_qMO_t)_y \quad (XVIII)$$

$$MO_2/[R^1(R^1_rMO_t)_m]_x/[R^2(R^1_rMO_t)_m]_y \quad (XIX)$$

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is independently selected in each instance from a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and x and y each is independently a number from 0.01 to 100; and M is selected from Si, Ti, or Zr; with a median pore size range from about 15 to about 1000 Å; a specific surface area of from about 5 to about 1000 m²/g; and a median size range from about 0.5 μm to about 100 μm.

Methods of Preparing Superficially Porous Particles

Aspects of the present disclosure include a process for making superficially porous particles. The particles can have narrow particle size distribution and ordered pore structures. In some instances, the starting material used to make the subject particles are monodispersed solid inorganic oxide (e.g., metal oxide) particles that can be made by known processes (see, e.g., U.S. Pat. Nos. 3,634,588, 4,775,520, 4,983,369) or by sintering porous particles at temperatures as high as 1100° C. to the proper size to form solid particles. By "solid particles" is meant those having a very low pore volume (i.e., ≤0.005 cm³/g). Such solid particle starting materials can be pure or substantially pure inorganic oxide particles, or they can be organically modified hybrids of one or more of said inorganic oxides. For example, if the inorganic oxide is silica, hybrid silica refers to a material having the formula $SiO_2/(R^1_pR^2_qSiO_t)_n$ or $SiO_2/[R^3(R^1_rSiO_t)_m]_n$; wherein $R^1$ and $R^2$ are independently a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^3$ is a substituted or unsubstituted $C_1$ to $C_7$ alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100.

In some embodiments of the subject methods, such inorganic oxide particles are partially dissolved at a pH and for a time and temperature under agitation in the presence of one or more surfactants (e.g., as described herein) so as to produce superficially porous particles having a relatively monodispersed particle size and a dual pore structure (e.g., as described herein).

Inorganic oxides of silica, alumina, zirconia and titania can be dissolved in either strong basic or acidic solution, depending on the inorganic oxide. For example, silica can be dissolved in a high pH solution such as sodium hydroxide or ammonia solution, and in a hydrofluoric acid solution. In some embodiments of the subject processes, such monodisperse solid inorganic oxide particles are only partially dissolved. As such, the pH range can be broader for partial dissolution as compared to complete dissolution. For example, in the case of alumina solid particles, acidic pH can be used for dissolution of alumina (and negatively charged surfactants or non-ionic surfactants can be used to form pores). Where the solid particles comprise silica, the solution can contain fluoride ion such as hydrofluoric acid or ammonium fluoride for partial dissolution. For example, silica can be partially dissolved in the presence of hydrofluoric acid at a concentration from 50 ppm to 5000 ppm. When such an acid is used, the concentration of hydrofluoric acid is preferably 200 to 800 ppm. Alternatively, the solid silica particles can be partially dissolved where the pH of the solution is basic from about 10 to about 13.5, more preferably from about 12 to about 13.5 The base used to achieve such basic pH is preferably one such as ammonium hydroxide.

In some instances, as far as a sufficient temperature for the subject processes, the solution is either under reflux or in an autoclave at a temperature higher than about 50° C. from one hour to seven days, in some cases under reflux. By "under reflux" is meant the technique where the solution, optionally under stirring, inside a reaction vessel is connected to a condenser, such that vapors given off by the reaction mixture are cooled back to liquid, and sent back to the reaction vessel. The vessel can then be heated at the desired temperature for the course of the reaction. The purpose is to accelerate the reaction thermally by conducting it at an elevated temperature (i.e. the boiling point of the aqueous solution). The advantage of this technique is that it can be left for a long period of time without the need to add more solvent or fear of the reaction vessel boiling dry as the vapor is condensed in the condenser. In addition, as a given solvent will always boil at a certain temperature, one can be sure that the reaction will proceed at a fairly constant temperature within a narrow range. In some cases, we reflux the mixtures described herein for less than about 7 days, preferably at least one hour, more preferably from about 2 to about 72 hours at a temperature of from about 75 to about 110° C., in some cases from about 85 to about 100° C.

By "agitation," is meant sufficient movement of the solution containing the particles so that the particles do not agglomerate. Agitation can be done by stirring, sparging, ultrasonicating, shaking and the like. Stirring the mixture is preferred.

As mentioned previously, the subject processes can utilize a surfactant. One or more ionic surfactants or non-ionic surfactants can be used. In some embodiments, the method includes subjecting substantially solid inorganic oxide particles selected from, silica, hybrid material, alumina, zirconia, or titania, in an aqueous solution to agitation for a time and a pH sufficient to pseudomorphically transform said particles, in the presence of a first cationic surfactant and a second anionic surfactant that together form micelles (e.g., catanionic vesicles, as described herein). The relative amount of first and second surfactants can be selected to provide for a desired micelle size and types. In some instances, the ratio (e.g., molar ratio) of cationic to anionic surfactant is between 5 to 1 and 20 to 1, such as about 6 to 1, about 7 to 1, about 8 to 1, about 9 to 1 about 10 to 1, about 11 to 1, about 12 to 1, or about 15 to 1. In some instances, the molar ratio of cationic to anionic surfactant is 2 or more, such as 3 or more, 4 or more, 5 or more, 10 or more, or even more. In some instances, the molar ratio of cationic to anionic surfactant is between 2 and 20, such as between 3 and 20, 4 and 20, 5 and 20, 5 and 15, or between 6 and 13, such as about 6.0, about 6.5, about 7.0, about 7.5, about 8.0, about 8.5, about 9.0, about 9.5, about 10.0, about 10.5, about 11.0, about 11.5, about 12.0, about 12.5 or about 13.0.

Any convenient cationic and anionic surfactants can be utilized in the subject methods. In some cases, the surfactants are selected from one or more of the group of polyoxyethylene sorbitans, polyoxythylene ethers, block copolymers, alkyltrimethylammonium, alkyl phosphates, alkyl sulfates, alkyl sulfonates, sulfosuccinates, carboxylic acid, surfactants comprising an octylphenol polymerized with ethylene oxide, and combinations thereof. In certain embodiments, the first and second surfactants are selected from block copolymers, alkyltrimethylammonium, alkyl phosphates, alkyl sulfates, alkyl sulfonates, sulfosuccinates and carboxylic acid surfactants.

In some cases, the surfactant(s) is a cationic surfactant selected from one or more of a compound of the formula $C_nH_{2n+1}(R)_3NX$ where X is a counterion selected from chlorine and bromine, and n is an integer from 10 to 20 and R is a lower alkyl (e.g., methyl). Preferred surfactants include, but are not limited to, trimethyloctadecyl-ammonium bromide and hexadecyltrimethylammonium bromide. In certain cases, the first cationic surfactant is selected from cetyl trimethylammonium bromide and octadecyl trimethylammonium bromide.

In certain embodiments, the second surfactant is an anionic surfactant and has the formula (II):

$$C_nH_{(2n+1)}OSO_3^-Y^+ \qquad (II)$$

wherein n is an integer from 10 to 20, and $Y^+$ is a counterion. In certain instances, the second anionic surfactant is selected from ammonium lauryl sulfate (ALS) and sodium dodecyl sulfate (SDS).

In some cases, the present disclosure provides a method for making superficially porous silica particles by subjecting substantially monodisperse solid silica particles to a basic aqueous solution under reflux with a cationic surfactant. In some cases, superficially porous silica particles are prepared using micelle-templated pseudomorphic synthesis. In some embodiments, solid silica cores were treated in a basic solution containing surfactants that form micelles, and swelling agents, under reflux condition from at least one hour to seven days. The outer layer of the solid cores is dissolved and re-precipitates to form a porous layer during a pseudomorphic transformation. By "pseudomorphic transformation" or "pseudomorphically transform," is meant process conditions that allow the metal oxide particles in question to be dissolved on their surfaces as the solid oxide surface is being replaced with a superficially porous shell at the same time such that the final superficially porous particles keep the same general size as the original solid particles, and thus retain the substantially monodispersed characteristic of the original starting material solid particles after pseudomorphic synthesis.

In certain cases of the process, an organic metal alkoxide molecule is added to the solution so as to form an organically modified hybrid metal oxide in the superficial pores on the particles. In some instances, the organic metal alkoxide is selected from one or more of the formulae I-IV:

$$(RO)_3M-R^2-M(OR)_3 \qquad (I)$$

$$(RO)_2R^1M-R^2-MR^1(OR)_2 \qquad (II)$$

$$(RO)_3M-R^1 \qquad (III)$$

$$(RO)_2M-R^1R^1 \qquad (IV)$$

wherein for formulae I-IV: R is selected independently in each instance from methyl and ethyl, $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and $R^2$ is selected from a substituted or unsubstituted $C_1$ to $C_7$ alkylene, alkenylene, alkynylene, or arylene group bridging two or more M atoms; and M is selected from Si, Ti and Zr.

When M is Si in Formulae I-IV, the organic metal alkoxide is, in some instances, selected from one or more of methyltriethoxysilane, ethyltriethoxysilane, 1,2-bis(triethoxysilyl)methane, 1,2-bis(triethoxysilyl)ethane and 1,2-bis(triethoxysilyl)benzene. Where M in formulae I-IV is Al, the organic metal alkoxide is selected from one or more of the formulae IX and X:

$$(RO)_2Al-R^2-Al(OR)_2 \qquad (IX)$$

$$(RO)_2Al-R^1 \qquad (X)$$

wherein R is selected independently in each instance from methyl and ethyl, $R^1$ is selected from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and $R^2$ is selected from a substituted or unsubstituted $C_1$ to $C_7$ alkylene, alkenylene, alkynylene, or arylene group bridging two or more Al atoms.

In some cases, the process employs a swelling agent (e.g., an agent that increases the size of micelles formed by the first and second surfactant).that can dissolve into the surfactant micelles. The swelling agent can cause the micelles to swell, increasing (adjusting) the size of the pores to the desired size. In some cases, the mixture of the pH adjuster (the base or acid), solid silica (or other metal oxide) particles and surfactant(s) is heated for a time (e.g., 20 minutes to 1.5 hours) at a temperature of from 30 to 60° C. before the swelling agent is added. The mixture containing the swelling agent is heated from 15 min to one month (but in some cases less than about 7 days) at a temperature of from about 75 to about 110° C. Whereupon the mixture is preferably refluxed as described above. In certain cases, the solid particles and surfactants are subjected to reflux in the presence of the swelling agent In some cases, the micelles (e.g., catanionic vesicles) have a median diameter of about 200 to about 2500 Å, such as from about 300 Å to about 2500 Å, from about 300 Å to about 500 Å, or from about 500 Å to about 1000 Å, or from about 1000 Å to about 2500 Å, etc.

Swelling agents of interest include, but are not limited to, an alkyl substituted benzene, a dialkylamine, a trialkylamine, a tertraalkyl ammonium salt, an alkane of the formula $(C_nH_{2n-2})$ where n is an integer of 5-20 (ref: Ulagappan, N., Chem. Commun., 1996), a cycloalkane of the formula $(C_nH_{2n})$ where n is an integer of 5-20, a substituted alkane of the formula $(X—C_nH_{2n+1})$ where n is an integer of 5-20 and X is chloro, bromo, or —OH, or a substituted cycloalkane of the formula $(X—C_nH_{2n-1})$ where n is an integer of 5-20 and X is chloro-, bromo-, or —OH. In certain instances, the swelling agent is selected from trimethylbenzene; triisopropylbenzene; N,N-dimethylhexadecylamine, N,N-dimethyldecylamine, trioctylamine and tridodecylamine; cyclohexane, cyclohexanol, dodecanol, chlorododecane and tetramethylammonium and tetraethylammonium sodium salts. In certain instances, the swelling agent is an alkane having up to 20 carbons (e.g., n=10-15, as described above).

In some cases, the swelling agent is included in the subject methods is an amount that is 20% or less by weight (e.g., 1% to 10% or 10 to 20% by weight) of total surfactant. In certain instances, the swelling agent is present in a molar ratio of 10x or less relative to the total surfactant, such as 6x or less (e.g.,3x to 6x) of swelling agent to total surfactant.

In some instances, the solid particles, the surfactant and the optional swelling agent are subjected to elevated temperature in the aqueous solution, in some cases under reflux. The micelles formed in the solution can cause the inorganic oxide dissolved from the partially dissolved inorganic oxide particles to re-deposit onto the partially dissolved particles due to the attraction of the dissolved inorganic oxide to the micelles. After the treatment, for example reflux, is complete, the particles are separated from the solution (e.g., by centrifugation, filtration and the like), and the particles are subjected to a treatment (e.g., with elevated temperature) to drive off (e.g., combust or volatilize) the surfactant and swelling agent from the particles. If the optional organosilane is bound (e.g., covalently) to the particles, the particles are subjected to a solvent extraction treatment (e.g., agitating in ethanol/HCl with elevated temperature) to wash off the surfactant and swelling agent from the particles so that the organosilane still remains bound after such treatment.

In some embodiments, to make superficially porous particles of formulae XVI-XIX from the starting materials of formulae XI and XII, the solid hybrid starting materials of Formulae XI and XII are pseudomorphically transformed in accordance with the subject method in the presence of one or more organic-inorganic alkoxides of Formulae I-IV in the process. The resulting product is superficially porous particles, comprising an organic metal oxide having a composition selected from one or more of Formulae XVI-XIX where the particles can have:

(a) a specific surface area of from about 5 to about 1000 $m^2/g$;

(b) a median pore size range from about 15 to about 1000 Å for the cylindrical pores; and (c) a median size range from about 0.5 μm to about 100 μm for the conical pores.

In some instances, the superficially porous particles comprise an organic metal oxide having a composition selected from one or more of formulae XX-XXIII:

 (XX)

 (XXI)

 (XXII)

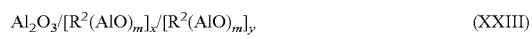 (XXIII)

wherein $R^1$ is independently selected in each instance from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is independently selected in each instance from a substituted or unsubstituted $C_1$ to $C_7$alkylene, alkenylene, alkynylene, or arylene group moiety bridging two or more Al atoms; m is an integer greater than or equal to 2; and x and y each is independently a number from 0.01 to 100; with a median pore size range from about 15 to about 1000 Å; a specific surface area of from about 5 to about 1000 $m^2/g$; and a median size range from about 0.5 μm to about 100 μm.

To produce superficially porous particles of Formulae XX-XXIII, one can start with substantially solid hybrid solid particles of the Formulae XXIV and XXV:

 (XXIV)

 (XXV)

wherein $R^1$ is a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted $C_1$ to $C_7$ alkylene, alkenylene, alkynylene, or arylene, or polar embedded $C_1$ to $C_7$ alkylene, alkenylene, alkynylene, or arylene group moiety bridging two or more Al atoms; m is an integer greater than or equal to 2; and n is a number from 0.01 to 100.

To make the superficially porous particles of formulae XX-XXIII from the solid hybrid particle starting material of formulae XXIV and XXV, the solid hybrid starting materials of Formulae XXIV and XXV can be pseudomorphically transformed in accordance with the method of this invention in the presence of one or more organic metal alkoxides of Formulae XXVI and XXVII:

$$(RO)_2Al—R^3—Al(OR)_2 \quad (XXVI)$$

$$(RO)_2Al—R^1 \quad (XXVII)$$

wherein R is selected independently in each instance from methyl and ethyl, $R^1$ is selected from a substituted or unsubstituted $C_1$ to $C_{18}$ alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, and $R^3$ is selected from a substituted or unsubstituted $C_1$ to $C_7$ alkylene, alkenylene, alkynylene, or arylene group bridging two or more Al atoms.

The alkoxides of Formulae XXVI and XXVII are either commercially available or can be made as taught in standard organometallic synthetic methods. The resulting product from the reaction is superficially porous particles, comprising an organic metal oxide having a composition selected from one or more of Formulae XX-XXIII with a median pore size range from about 15 to about 1000 A; a specific surface area of from about 5 to about 1000 $m^2/g$; and a median size range from about 0.5 μm to about 100 μm.

The superficially porous particles can also be surface modified with a surface modifier having the formula $Z_a(R')_bSi—R$, where Z is selected from Cl, Br, I, $C_1$-$C_5$ alkoxy, dialkylamino, trifluoroacetoxy or trifluoromethanesulfonate; a and b are each an integer from 0 to 3 provided that a+b=3; R' is a $C_1$-$C_6$ straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

The micelle-templated superficially porous particles exhibit at least one X-ray diffraction peak between 0.01° and 10° of the 2θ scan range (due to the ordered pore structure) as shown in FIG. 3. X-ray diffraction is a well-known characterization technique in the art (R. Jenkins, R. L. Snyder, Introduction to X-ray Powder Diffractometry, John Wiley & Sons, Inc., New York, 1996). The ordered pore structures may be further characterized by symmetry or space groups that are observed from X-ray diffraction, including but not limited to hexagonal, cubic, triclinic, monoclinic, orthorhombic, tetragonal, trigonal and lamellar.

Utility

The subject superficially porous particles, device, kits and methods can be employed in a variety of diagnostic, analytical and research applications. The subject compositions and methods find use in any applications where the separation or purification of a variety of analytes in a sample is desirable. In some cases, the subject particles find use in the separation of a plurality of analytes from a sample via a chromatography method, where the subject particles are configured as the stationary phase (e.g., a particulate support) in a separation device. In general terms, the plurality of analytes can span a wide range of MWs, e.g., from 1kDa to 500 kDa, such as from 1 kDa to 400 kDa, from 1 kDa to 300 kDa, or from 1 kDa to 200 kDa. In some cases, the method of separating includes contacting a sample comprising at least first and second analytes with the particulate support (e.g. as described herein) and eluting the analytes from the support thereby separating the at least first and second analytes. The first analyte can have a MW of 50 kDa or more, such as 75 kDa or more, 100 kDa or more, 200 kDa or more, etc., while the second analyte can have a MW of 20 kDa or less, such as 15 kDa or less, 10 kDa or less, 5 kDa or less, 4 kDa or less, 3 kDa or less, 2 kDa or less, 1 kDa or less, etc. Any convenient analytes can be separated, including but not limited to, an oligonucleotide, a peptide, a polypeptide, an antibody, and conjugates thereof.

Kits and Devices

Aspects of the present disclosure include separation devices including the subject superficially porous particles. The subject superficially porous particles can be utilized with any convenient separation devices having a stationary phase. Devices of interest include, but are not limited to, a chromatography column, a chip, a solid phase extraction media, a pipette tip and a disk.

Also provided by the present disclosure are kits including the superficially porous particles, as described herein. The subject kits at least include superficially porous particles (e.g., as described herein) and one or more components selected from an analytical standard, a separation device (e.g., a chromatography column, a chip, a solid phase extraction media, a pipette tip, a disk), an elution buffer and a wash buffer.

The various components of the kit can be present in separate containers or certain compatible components can be pre-combined into a single container, as desired. The subject kits can also include one or more other reagents for preparing or processing an analyte sample. The reagents can include one or more matrices, solvents, sample preparation reagents, buffers, desalting reagents, enzymatic agents, denaturing reagents, where calibration standards such as positive and negative controls can be provided as well. As such, the kits can include one or more containers such as vials or bottles, with each container containing a separate component for carrying out a sample processing or preparing step and/or for carrying out one or more steps of a sample preparation and analysis protocol. In addition, the kits can also include one or more control analyte mixtures, e.g., two or more control samples for use in testing the kit.

In addition to above-mentioned components, the subject kits can further include instructions for using the components of the kit to practice the subject methods, i.e., to prepare a sample and/or assess a sample. The instructions for practicing the subject methods are generally recorded on a suitable recording medium. For example, the instructions can be printed on a substrate, such as paper or plastic, etc. As such, the instructions can be present in the kits as a package insert, in the labeling of the container of the kit or components thereof (i.e., associated with the packaging or subpackaging) etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

The following examples are offered by way of illustration and not by way of limitation.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

allowed to cool to room temperature. The solution was filtered, washed with water, ethanol, and acetone, and dried in a vacuum oven at 100° C. for at least 2 hours. Then the silica particles were calcined at 600° C. for 10 hours at a heating rate of 1° C. per minute.

TABLE 1

| SAMPLE# | CORE | TMAOH | CTAB | ALS | $C_{13}H_{28}$ | $H_2O$ | Surface Area ($m^2/g$) | Average Pore Size (Å) | Pore Volume ($cm^3/g$) |
|---|---|---|---|---|---|---|---|---|---|
| 4E | 12 | 2 | 6 | 2.10 | 20 | 240 | 89 | 126 | 0.28 |
| 4F | 12 | 2 | 6 | 2.70 | 20 | 240 | 74 | 162 | 0.30 |
| 4G | 12 | 2 | 6 | 3.40 | 20 | 240 | 34 | 186 | 0.16 |

Example 1

Preparation of Superficially Porous Particles

Chemicals and Reagents

Ammonium lauryl sulfate (ALS, $(CH_3(CH_2)_{10}CH_2OSO_3NH_4)$) and tetramethylammonium hydroxide (TMAOH) solution were supplied by Sigma-Aldrich, Corp. (St. Louis, USA). Trimethyloctadecylammonium bromide (($C_{18}H_{37}$)N($CH_3$)$_3$Br, $C_{18}$TAB) and tridecane were supplied by TCI America (Portland, USA). All analytes for chromatographic evaluation were purchased from Sigma-Aldrich, Corp.

Particle Characterization

The elemental analysis (carbon loading) was measured on a PerkinElmer 2400 analyzer (Micro-Analysis, Inc.). The measured carbon loading was less than 0.05% after the calcination step, which indicated that the surfactants were removed. The surface area, pore size, and pore volume of these particles were measured with a TriStar 3000 analyzer (Micromeritics Instrument Corp.). The volume of adsorbed nitrogen was measured as a function of the relative pressure p/p° at a temperature of 77 K. Particle size was measured by a Multisizer 3 Coulter Counter (Beckman Coulter, Inc.). The morphology and pore structure of the particles were determined by scanning electron microscopy (Auriga 60, ZEISS) and transmission electron microscopy (JEM-2010F, JEOL)

Silica Particle Synthesis

Monodisperse solid, nonporous silica cores were synthesized by a modified Stöber process. Particle size can be tuned and controlled up to 10 μm with $d_{90}/d_{10}$ less than 1.10. Solid silica particles (12.0 g) were slurried in 240 mL deionized water in a flask. Tetramethylammonium hydroxide (2.0 g of 25 wt %), various amounts of ammonium lauryl sulfate and 6.0 g trimethyloctadecylammonium bromide were added. The mixture was heated at 50° C. for 40 minutes under stirring. 20 grams of tridecane were added to the solution mixture and stirred for another hour to expand the micelles. Next, the solution was refluxed for 3 days and then Example 2

Hybrid Silica Particle Synthesis

Monodisperse solid, nonporous hybrid silica cores were synthesized by a modified Stöber process. Particle size can be tuned and controlled up to 10 μm with $d_{90}/d_{10}$ less than 1.10. Solid silica particles (3.0 g) were slurried in 240 mL deionized water in a flask. tetramethylammonium hydroxide (2.0 g of 25 wt %), various amounts of Ammonium lauryl sulfate and 2.6 g trimethyloctadecylammonium bromide were added. The mixture was heated at 50° C. for 40 minutes under stirring. 5.0 grams of decane were added to the solution mixture and stirred for another hour to expand the micelles. Next, the solution was refluxed for 3 days and then allowed to cool to room temperature. The solution was filtered, washed with water, ethanol, and acetone, and dried in a vacuum oven at 100° C. for at least 2 hours. Then the surfactants were removed by mixing the particles in HCl/ethanol at 70° C. overnight.

TABLE 2

| SAMPLE# | CORE | TMAOH | CTAB | ALS | $C_{10}H_{22}$ | H2O | Surface Area ($m^2/g$) | Average Pore Size (Å) | Pore Volume ($cm^3/g$) |
|---|---|---|---|---|---|---|---|---|---|
| 3A | 3 | 2 | 2.6 | 0.50 | 5 | 240 | 113 | 78 | 0.22 |
| 3B | 3 | 2 | 2.6 | 0.75 | 5 | 240 | 110 | 93 | 0.26 |
| 3C | 3 | 2 | 2.6 | 1.00 | 5 | 240 | 119 | 99 | 0.30 |
| 3G | 3 | 2 | 2.6 | 1.50 | 5 | 240 | 104 | 107 | 0.28 |

Column Packing and Chromatographic Testing

The particles were bonded with C18 and endcapped. The bonded particles were packed by a proprietary process into 2.1×50 mm columns. An Agilent 1200SL HPLC with a maximum operating pressure of 600 bar was used to test each column. Agilent ChemStation software (version C.01.06) was used for instrument control and data collection. All the capillary tubing connections from the injector to the detector were 0.12 mm id.

Example 3

Separation of Analytes

FIG. 7, panels (a)-(b) shows HPLC chromatograms comparing peptide separations achieved using an Agilent AdvanceBio peptide mapping column (a) versus a column including exemplary superficially porous particles of the present disclosure. Description of a peptide mixture loaded onto the columns is listed in the table below.

TABLE 3

Peptide mixture for separation.

| Peptide | MW (Da) | Sequence | Weight (ug) |
|---|---|---|---|
| Bradykinin frag 1-7 | 756.85 | RPPGFSP (SEQ ID NO: 1) | 5.14 |
| Bradykinin | 1060.21 | RPPGFSPFR (SEQ ID NO: 2) | 5.14 |
| Angiotensin II (human) | 1045.53 | DRVYIHPF (SEQ ID NO: 3) | 5.14 |
| Neurotensin | 1672.92 | Glp-LYENKPRRPYIL (SEQ ID NO: 4) | 5.14 |
| Angiotensin I (human) | 1296.48 | DRVYIHPFHL (SEQ ID NO: 5) | 5.14 |
| Renin substrate porcine | 1759.01 | DRVYIHPFHLLYS (SEQ ID NO: 6) | 5.14 |
| (Ace-F-3,-2 H-1) Angiotensinogen (1-14) | 2231.61 | Ace-FFHDRVYIHPFHLLVYS (SEQ ID NO: 7) | 5.14 |
| Ser/Thr Protein Phosphatase (15-31) | 1952.39 | E1 FLSQPI LLELEAPLK (SEQ ID NO: 8) | 19.55 |
| F14) Ser/Thr Protein Phosphatase (15-31) | 2099.00 | FEIFLSQPILLELEAPLK (SEQ ID NO: 9) | 10.29 |
| Melittin (bee venom) | 2846.46 | GIGAVLKVLTTGLPALISWIKRKRQQ (SEQ ID NO: 10) | 5.14 |

FIG. 8, panels (a)-(b), shows HPLC chromatograms comparing protein separations achieved using an Agilent AdvanceBio RP-mAb column (a) versus a column including exemplary superficially porous particles of the present disclosure. Description of protein mixture loaded onto the columns is listed in the table below:

TABLE 4

Protein mixture for separation.

| Sample | MW (Da) |
|---|---|
| Ribonuclease A | 13700 |
| Cytochrome C | 12300 |
| Halo-transferrin | 76500 |
| A-lactalbumin | 14200 |
| Catalase | 240000 |
| Carbonic anhydrase | 30000 |

FIG. 9, panels (a)-(b) shows HPLC chromatograms comparing small molecule separations achieved using an Agilent Poroshell 120 column (a) versus a column including exemplary superficially porous particles of the present disclosure. The sample mixture included uracil, phenol, 4-chloronitrobenzene, naphthalene, which were loaded onto the columns and eluted with 70/30 $CH_3CN/H_2O$ at 0.4 ml/min.

TABLE 5

Column Performance Comparison.

| Particles | Plates | Back pressure (bar) | Reduced plate height |
|---|---|---|---|
| SPP of present disclosure | 12077 | 203 | 1.36 |
| 2.7 um Poroshell 120 | 8307 | 211 | 1.82 |

The exemplary superficially porous particles utilized in these examples are silica particles. The process can be applied to make superficially porous particles with various physical combinations for different purposes. For example, a hollow core can lower the particle density to reduce the impact on superficially porous particles hitting the outlet frit during packing. An inorganic/organic metal oxide superficially porous particle prepared according to the subject methods can significantly improve the pH stability.

Although the foregoing invention has been described in some detail by way of illustration and example for purposes of clarity of understanding, it is readily apparent to those of ordinary skill in the art in light of the teachings of this invention that certain changes and modifications can be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the embodiments shown and described herein. Rather, the scope and spirit of present invention is embodied by the appended embodiments.

EMBODIMENTS

Aspects of the present disclosure include superficially porous particles. In some embodiments, the particles include a non-porous inner core; and a porous outer shell, comprising: an inner porous region comprising ordered cylindrical pores substantially perpendicular to the non-porous inner core, wherein the median cylindrical pore size (e.g., diameter) is from about 15 to about 1000 Å; an outer porous region comprising conical pores which extend to the surface of the particles and have a median conical pore size of about 300 to about 2500 Å, wherein the conical pores are operably connected (e.g., in fluid communication with) to the cylindrical pores of the inner porous region; and wherein the median conical pore size is larger than the median cylindrical pore size.

In some embodiments of the superficially porous particles, the cylindrical pore size distribution (one standard deviation) is ±50% or less (e.g., ±40% or less, ±30% or less, ±20% or less, ±10% or less, etc.) of the median cylindrical pore size. In some embodiments of the superficially porous particles, the median conical pore size is at least 50% larger than the median cylindrical pore size (such as at least 2-fold, at least 3-fold, at least 5-fold, at least 10-fold, at least 30-fold, at least 100-fold larger, etc.). In some embodiments of the superficially porous particles, the median cylindrical pore size is from about 50 Å to about 800 Å. In some embodiments of the superficially porous particles, the median cylindrical pore size is from about 50 Å to about 300 Å (e.g., from about 70 Å to about 200 Å, from about 70 Å to about 150 Å, or from about 50 Å to about 100 Å). In some embodiments of the superficially porous particles, the median conical pore size is from about 200 Å to about 2500 Å (e.g., from about 300 Å to about 500 Å, from about 500 Å to about 100 Å, or from about 1000 Å to about 2500 Å, etc.). In some embodiments of the superficially porous particles, the non-porous inner core has a median diameter of from about 20% to about 99% of the median diameter of the superficially porous particle. In some embodiments of the superficially porous particles, the particles have a specific surface area of from about 5 to about 1000 m²/g. In some embodiments of the superficially porous particles, the particles have a median diameter from about 0.5 µm to about 100 µm with a particle size distribution (one standard deviation) of no more than ±15% of the median particle size. In some embodiments of the superficially porous particles, the non-porous inner core comprises an inorganic oxide selected from silica, alumina, titania or zirconia. In some embodiments of the superficially porous particles, the porous outer shell comprises an inorganic oxide selected from silica, alumina, titania or zirconia. In some embodiments of the superficially porous particles, the inorganic oxide is an organically modified hybrid.

In some embodiments of the superficially porous particles, the organic material is covalently attached to the metal oxide and the particles have a composition selected from: $MO_2/(R^1_p R^1_q MO_t)_n$ or $MO_2/[R^2(R^1_r MO_t)_m]_n$ wherein $R^1$ is independently selected in each instance from a substituted or unsubstituted C1 to C18 alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted C1 to C7 alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is Si, Ti, or Zr.

In some embodiments of the superficially porous particles, the non-porous inner core is hollow. In some embodiments of the superficially porous particles, the non-porous inner core is a composite material that comprises a magnetic additive material. In some embodiments, the superficially porous particles have been surface modified with a surface modifier having the formula $Z_a(R')_b Si-R$, where Z is selected from Cl, Br, I, C1-C5 alkoxy, dialkylamino, trifluoroacetoxy or trifluoromethanesulfonate; a and b are each an integer from 0 to 3 provided that a+b=3; R' is a C1-C6 straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

Aspects of the present disclosure include a superficially porous particle. In some embodiments, the particle includes a non-porous inner core; and a porous outer shell, comprising: an inner porous region comprising ordered cylindrical pores substantially perpendicular to the non-porous inner core, wherein the median cylindrical pore size (e.g., diameter) is from about 15 to about 1000 Å; an outer porous region comprising conical pores which extend to the surface of the particle and have a median conical pore size of about 300 to about 2500 Å, wherein the conical pores are operably connected (e.g., in fluid communication with) to the cylindrical pores of the inner porous region; and wherein the median conical pore size is larger than the median cylindrical pore size.

In some embodiments of the superficially porous particle, the cylindrical pore size distribution (one standard deviation) is ±50% or less (e.g., ±40% or less, ±30% or less, ±20% or less, ±10% or less, etc.) of the median cylindrical pore size. In some embodiments of the superficially porous particle, the median conical pore size is at least 50% larger than the median cylindrical pore size (such as at least 2-fold, at least 3-fold, at least 5-fold, at least 10-fold, at least 30-fold, at least 100-fold larger, etc.). In some embodiments of the superficially porous particle, the median cylindrical pore size is from about 50 Å to about 800 Å. In some embodiments of the superficially porous particle, the median cylindrical pore size is from about 50 Å to about 300 Å (e.g., from about 70 Å to about 200 Å, from about 70 Å to about 150 Å, or from about 50 Å to about 100 Å). In some embodiments of the superficially porous particle, the median conical pore size is from about 200 Å to about 2500 Å (e.g., from about 300 Å to about 500 Å, from about 500 Å to about 100 Å, or from about 1000 Å to about 2500 Å, etc.). In some embodiments of the superficially porous particle, the non-porous inner core has a median diameter of from about 20% to about 99% of the median diameter of the superficially porous particle. In some embodiments of the superficially porous particle, the particle has a specific surface area of from about 5 to about 1000 m²/g. In some embodiments of the superficially porous particle, the particle has a median diameter from about 0.5 µm to about 100 µm with a particle size distribution (one standard deviation) of no more than ±15% of the median particle size. In some embodiments of the superficially porous particle, the non-porous inner core comprises an inorganic oxide selected from silica, alumina, titania or zirconia. In some embodiments of the superficially porous particle, the porous outer shell comprises an inorganic oxide selected from silica, alumina, titania or zirconia. In some embodiments of the superficially porous particle, the inorganic oxide is an organically modified hybrid.

In some embodiments of the superficially porous particle, the organic material is covalently attached to the metal oxide and the particles have a composition selected from: $MO_2/(R^1_pR^1_qMO_t)_n$ or $MO_2/[R^2(R^1_rMO_t)_m]_n$ wherein $R^1$ is independently selected in each instance from a substituted or unsubstituted C1 to C18 alkyl, alkenyl, alkynyl, or aryl group, wherein the substituents are selected from halogen, diol, amino-, alcohol, amide, cyano, ether, nitro, carbonyl, epoxide, sulfonyl, cation exchanger, anion exchanger, carbamate and urea, $R^2$ is a substituted or unsubstituted C1 to C7 alkylene, alkenylene, alkynylene, or arylene group moiety bridging two or more metal atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100; and M is Si, Ti, or Zr.

In some embodiments of the superficially porous particle, the non-porous inner core is hollow. In some embodiments of the superficially porous particle, the non-porous inner core is a composite material that comprises a magnetic additive material. In some embodiments, the superficially porous particle has been surface modified with a surface modifier having the formula $Z_a(R')_bSi-R$, where Z is selected from Cl, Br, I, C1-C5 alkoxy, dialkylamino, trifluoroacetoxy or trifluoromethanesulfonate; a and b are each an integer from 0 to 3 provided that a+b=3; R' is a C1-C6 straight, cyclic or branched alkyl group, and R is a functionalized group selected from group consisting of alkyl, alkenyl, alkynyl, aryl, diol, amino-, alcohol, amide, cyano, ether, nitro, carbonyl, epoxide, sulfonyl, cation exchanger, anion exchanger, carbamate and urea.

Aspects of the present disclosure include methods of making superficially porous particles. In some embodiments, the method includes: subjecting substantially solid inorganic oxide particles selected from, silica, hybrid material, alumina, zirconia, or titania, in an aqueous solution to agitation for a time and a pH sufficient to pseudomorphically transform said particles, in the presence of a first cationic surfactant and a second anionic surfactant that together form micelles. In some embodiments of the method, the first and second surfactants are selected from block copolymers, alkyltrimethylammonium, alkyl phosphates, alkyl sulfates, alkyl sulfonates, sulfosuccinates and carboxylic acid surfactants. In some embodiments of the method, the first cationic surfactant has the formula (I): $C_nH_{(2n+1)}N(R)_3^+X^-$ (I), wherein n is an integer from 10 to 20, each R is a lower alkyl and $X^-$ is a counterion. In some embodiments of the method, the first cationic surfactant is selected from cetyl trimethylammonium bromide and octadecyl trimethylammonium bromide. In some embodiments of the method, the second anionic surfactant has the formula (II): $C_nH_{(2n+1)}OSO_3^-Y^+$ (II), wherein n is an integer from 10 to 20, and $Y^+$ is a counterion. In some embodiments of the method, the second anionic surfactant is selected from ammonium lauryl sulfate (ALS) and sodium dodecyl sulfate. In some embodiments of the method, the method is performed in the presence of a swelling agent (e.g., an agent that increases the size of micelles formed by the first and second surfactant). In some embodiments of the method, the micelles have a median diameter of about 300 to about 2500 Å. In some embodiments of the method, the solid particles and surfactant are subjected to reflux in the presence of the swelling agent. In some embodiments of the method, the swelling agent is selected from an alkyl substituted benzene, a dialkylamine, a trialkylamine, a tertraalkyl ammonium salt, or an alkane of the formula $C_nH_{(2n+2)}$ where n is an integer from 5 to 20 and, a cycloalkane of the formula $(C_nH_{2n})$ where n is an integer of 5~20, a substituted alkane of the formula $(X-C_nH_{(2n+1)})$ where n is an integer of 5~20 and X is chloro-, bromo-, or —OH, or a substituted cycloalkane of the formula $(X-C_nH_{(2n-1)})$ where n is an integer of 5~20 and X is chloro-, bromo-, or —OH. cyclohexane, cyclohexanol, dodecanol and, chlorododecane. In some embodiments of the method, the substantially solid metal oxide particles have a median particle diameter of about 0.5 μm to about 100 μm. In some embodiments of the method, the particles have a particle size distribution of no more than ±15% of the median particle size.

Aspects of the present disclosure include a method of separating a plurality of analytes. In some embodiments, the method includes: contacting a sample comprising at least first and second analytes with the particulate support (e.g., as described herein); and eluting the analytes from the support thereby separating the at least first and second analytes. In some embodiments of the method, the first analyte has a MW of 50 kDa or more (such as 75 kDa or more, 100 kDa or more, 200 kDa or more, etc.). In some embodiments of the method, the first analyte is a protein (e.g., an antibody). In some embodiments of the method, the second analyte has a MW of 20 kDa or less (such as 15 kDa or less, 10 kDa or less, 5 kDa or less, 4 kDa or less, 3 kDa or less, 2 kDa or less, 1 kDa or less, etc.). In some embodiments of the method, the second analyte is a peptide or small molecule. In some embodiments, the method further includes detecting the separated analytes.

Aspects of the present disclosure include a separation device having a stationary phase comprising superficially porous particles (e.g., as described herein). In some instances, the device is a chromatography column, a chip, a solid phase extraction media, a pipette tip or a disk. Also provided are kits. In some embodiments, the kit includes superficially porous particles (e.g., as described herein); and one or more components selected from an analytical standard, a separation device (e.g., a chromatography column, a chip, a solid phase extraction media, a pipette tip, a disk), an elution buffer and a wash buffer.

What is claimed is:

1. Superficially porous particles, comprising:
   non-porous inner cores; and
   porous outer shells, comprising:
      inner porous regions comprising ordered cylindrical pores substantially perpendicular to the non-porous inner cores, wherein the median cylindrical pore size is from about 15 to about 1000 Å;
      outer porous regions comprising conical pores which extend to the surface of the particles and have a median conical pore size of about 150 to about 2500 Å, wherein the conical pores are in fluid communication with the cylindrical pores of the inner porous regions; and
      wherein the median conical pore size is larger than the median cylindrical pore size.

2. The superficially porous particles of claim 1, wherein the median conical pore size is at least 50% larger than the median cylindrical pore size.

3. The superficially porous particles of claim 1, wherein the median cylindrical pore size is from about 50 Å to about 800 Å.

4. The superficially porous particles of claim 1, wherein the median cylindrical pore size is from about 100 Å to about 300 Å.

5. The superficially porous particles of claim 1, wherein the non-porous inner cores have a median size of from about 20% to about 99% of the median size of the superficially porous particles.

6. The superficially porous particles of claim 1, wherein the, non-porous inner cores comprise an inorganic oxide selected from silica, alumina, titania or zirconia.

7. The superficially porous particles of claim 1, that have been surface modified with a surface modifier having the formula $Z_a(R')_bSi—R$, wherein Z is selected from cl,Br, I, C1-C5 alkoxy, dialkylamino, trifluoroacetoxy and trifluoromethanesulfonate; a and b are each independently 0, 1, 2 or 3, provided that a+b=3; R' is a C1-C6 straight, cyclic or branched alkyl group, and R is a functionalized group selected from alkyl, alkenyl, alkynyl, aryl, diol, amino-, alcohol, amide, cyano, ether, nitro, carbonyl, epoxide, sulfonyl, cation exchanger, anion exchanger, carbamate and urea.

8. A superficially porous particle, comprising:

a non-porous inner core; and a porous outer shell, comprising:

an inner porous region comprising ordered cylindrical pores substantially perpendicular to the non-porous inner core, wherein the median cylindrical pore size is from about 15 to about 1000 Å;

an outer porous region comprising conical pores which extend to the surface of the particles and have a median conical pore size of about 150 to about 2500 Å, wherein the conical pores are in fluid communication with the cylindrical pores of the inner porous region; and wherein the median conical pore size is larger than the median cylindrical pore size.

9. The superficially porous particle of claim 8, wherein the median conical pore size is at least 50% larger than the median cylindrical pore diameter.

10. The superficially porous particle of claim 8, wherein the median cylindrical pore size is from about 50 Å to about 800 Å.

11. The superficially porous particle of claim 8, wherein the median cylindrical pore size is from about 100 Å to about 300 Å.

12. The superficially porous particle of claim 8, wherein the non-porous inner core has a median size of from about 20% to about 99% of the median size of the superficially porous particle.

13. A method of making superficially porous particles, the method comprising:

subjecting substantially solid inorganic oxide particles selected from, silica, hybrid material, alumina, zirconia, or titania, in an aqueous solution to agitation for a time and a pH sufficient to pseudomorphically transform said particles, in the presence of a first cationic surfactant and a second anionic surfactant that together form micelles;

wherein the transformed particles comprise:
non-porous inner cores; and
porous outer shells, comprising:
inner porous regions comprising ordered cylindrical pores substantially perpendicular to the non-porous inner cores, wherein the median cylindrical pore size is from about 15 to about 1000 Å;
outer porous regions comprising conical pores which extend to the surface of the particles and have a median conical pore size of about 150 to about 2500 Å, wherein the conical pores are in fluid communication with the cylindrical pores of the inner porous region; and
wherein the median conical pore size is larger than the median cylindrical pore size.

14. The method of claim 13, wherein the first and second surfactants are selected from block copolymers, alkyltrimethylammonium, alkyl phosphates, alkyl sulfates, alkyl sulfonates, sulfosuccinates and carboxylic acid surfactants.

15. The method of claim 13, wherein the first cationic surfactant has the formula (I):

$$C_nH_{(2n+1)}N(R)_3^+X^- \qquad (I)$$

wherein n is an integer from 10 to 20, each R is a lower alkyl and $X^-$ is a counterion.

16. The method of claim 15, wherein the first cationic surfactant is selected from cetyl trimethylammonium bromide and octadecyl trimethylammonium bromide.

17. The method of claim 13, wherein the second anionic surfactant has the formula (II):

$$C_nH_{(2n+1)}OSO_3^-Y^+ \qquad (II)$$

wherein n is an integer from 10 to 20, and $Y^+$ is a counterion.

18. The method of claim 17, wherein the second anionic surfactant is selected from ammonium lauryl sulfate (ALS) and sodium dodecyl sulfate.

19. The method of claim 13, wherein the method is performed in the presence of a swelling agent.

20. The method of claim 13, wherein the molar ratio of the first cationic surfactant to the second anionic surfactant is 2 or more.

* * * * *

SEQUENCE LISTING

<160> NUMBER OF SEQ ID NOS: 10

<210> SEQ ID NO 1
<211> LENGTH: 7
<212> TYPE: PRT
<213> ORGANISM: Artificial sequence
<220> FEATURE:
<223> OTHER INFORMATION: Synthetic nucleic acid sequence.

<400> SEQUENCE: 1

-continued

Arg Pro Pro Gly Phe Ser Pro
1               5

<210> SEQ ID NO 2
<211> LENGTH: 9
<212> TYPE: PRT
<213> ORGANISM: Artificial sequence
<220> FEATURE:
<223> OTHER INFORMATION: Synthetic nucleic acid sequence.

<400> SEQUENCE: 2

Arg Pro Pro Gly Phe Ser Pro Phe Arg
1               5

<210> SEQ ID NO 3
<211> LENGTH: 8
<212> TYPE: PRT
<213> ORGANISM: Artificial sequence
<220> FEATURE:
<223> OTHER INFORMATION: Synthetic nucleic acid sequence.

<400> SEQUENCE: 3

Asp Arg Val Tyr Ile His Pro Phe
1               5

<210> SEQ ID NO 4
<211> LENGTH: 12
<212> TYPE: PRT
<213> ORGANISM: Artificial sequence
<220> FEATURE:
<223> OTHER INFORMATION: Synthetic nucleic acid sequence.

<400> SEQUENCE: 4

Leu Tyr Glu Asn Lys Pro Arg Arg Pro Tyr Ile Leu
1               5                   10

<210> SEQ ID NO 5
<211> LENGTH: 10
<212> TYPE: PRT
<213> ORGANISM: Artificial sequence
<220> FEATURE:
<223> OTHER INFORMATION: Synthetic nucleic acid sequence.

<400> SEQUENCE: 5

Asp Arg Val Tyr Ile His Pro Phe His Leu
1               5                   10

<210> SEQ ID NO 6
<211> LENGTH: 13
<212> TYPE: PRT
<213> ORGANISM: Artificial sequence
<220> FEATURE:
<223> OTHER INFORMATION: Synthetic nucleic acid sequence.

<400> SEQUENCE: 6

Asp Arg Val Tyr Ile His Pro Phe His Leu Leu Tyr Ser
1               5                   10

<210> SEQ ID NO 7
<211> LENGTH: 17
<212> TYPE: PRT
<213> ORGANISM: Artificial sequence
<220> FEATURE:
<223> OTHER INFORMATION: Synthetic nucleic acid sequence.

<400> SEQUENCE: 7

Phe Phe His Asp Arg Val Tyr Ile His Pro Phe His Leu Leu Val Tyr

```
                                -continued
1               5               10              15
Ser <210> SEQ ID NO 8
<211> LENGTH: 17
<212> TYPE: PRT
<213> ORGANISM: Artificial sequence
<220> FEATURE:
<223> OTHER INFORMATION: Synthetic nucleic acid sequence.

<400> SEQUENCE: 8

Glu Ile Phe Leu Ser Gln Pro Ile Leu Leu Glu Leu Glu Ala Pro Leu
1               5                   10                  15

Lys

<210> SEQ ID NO 9
<211> LENGTH: 18
<212> TYPE: PRT
<213> ORGANISM: Artificial sequence
<220> FEATURE:
<223> OTHER INFORMATION: Synthetic nucleic acid sequence.

<400> SEQUENCE: 9

Phe Glu Ile Phe Leu Ser Gln Pro Ile Leu Leu Glu Leu Glu Ala Pro
1               5                   10                  15

Leu Lys

<210> SEQ ID NO 10
<211> LENGTH: 26
<212> TYPE: PRT
<213> ORGANISM: Artificial sequence
<220> FEATURE:
<223> OTHER INFORMATION: Synthetic nucleic acid sequence.

<400> SEQUENCE: 10

Gly Ile Gly Ala Val Leu Lys Val Leu Thr Thr Gly Leu Pro Ala Leu
1               5                   10                  15

Ile Ser Trp Ile Lys Arg Lys Arg Gln Gln
            20                  25
```